(12) United States Patent
Xiao et al.

(10) Patent No.: US 12,469,461 B2
(45) Date of Patent: Nov. 11, 2025

(54) SCAN DRIVER CIRCUIT AND CONTROL METHOD THEREOF, DISPLAY PANEL, DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Bangqing Xiao, Beijing (CN); Benlian Wang, Beijing (CN); Hai Zheng, Beijing (CN); Ming Hu, Beijing (CN)

(73) Assignees: Chengdu BOE Optoelectronics Technology Co., Ltd., Sichuan (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/291,020

(22) PCT Filed: Mar. 8, 2023

(86) PCT No.: PCT/CN2023/080359
§ 371 (c)(1),
(2) Date: Jan. 22, 2024

(87) PCT Pub. No.: WO2024/183041
PCT Pub. Date: Sep. 12, 2024

(65) Prior Publication Data
US 2025/0104644 A1  Mar. 27, 2025

(51) Int. Cl.
*G09G 3/3266* (2016.01)
*G09G 3/3225* (2016.01)
*G11C 19/28* (2006.01)

(52) U.S. Cl.
CPC ......... *G09G 3/3266* (2013.01); *G09G 3/3225* (2013.01); *G11C 19/287* (2013.01);
(Continued)

(58) Field of Classification Search
CPC ............... G09G 3/3266; G09G 3/3225; G09G 2300/0819; G09G 2300/0842;
(Continued)

(56) References Cited

U.S. PATENT DOCUMENTS 11,776,470 B2 * 10/2023 Xu ........................ G11C 19/28
345/204
11,875,749 B2 * 1/2024 Yu ........................ G09G 3/3266
(Continued)

FOREIGN PATENT DOCUMENTS

CN      107403604 A      11/2017
CN      108564916 A       9/2018
(Continued)

*Primary Examiner* — Benyam Ketema
(74) *Attorney, Agent, or Firm* — WHDA, LLP

(57) ABSTRACT

The present disclosure relates to a scan driver circuit including clock signal lines and cascaded shift registers. The shift registers include an input sub-circuit, a first control sub-circuit, a second control sub-circuit and an output sub-circuit. The input sub-circuit is connected to a starting signal terminal, a first node and a first signal terminal. The first control sub-circuit is connected to the first signal terminal, the first node and a second node. The second control sub-circuit is connected to the first node, the second node, a second voltage terminal and a third signal terminal. The output sub-circuit is connected to the first node, the second node, an output terminal, a second signal terminal and the second voltage terminal. The second signal terminal and the third signal terminal of the same shift register are connected to different clock signal lines.

15 Claims, 14 Drawing Sheets

(52) U.S. Cl.
CPC .............. *G09G 2300/0819* (2013.01); *G09G 2300/0842* (2013.01); *G09G 2300/0861* (2013.01); *G09G 2310/0286* (2013.01); *G09G 2310/08* (2013.01); *G09G 2320/0233* (2013.01)

(58) Field of Classification Search
CPC ... G09G 2300/0861; G09G 2310/0286; G09G 2310/08; G09G 2320/0233; G11C 19/287
See application file for complete search history.

(56) References Cited

U.S. PATENT DOCUMENTS

| | | | | |
|---|---|---|---|---|
| 2004/0227718 | A1* | 11/2004 | Park ..................... | G11C 19/184 345/100 |
| 2011/0273418 | A1* | 11/2011 | Park ..................... | H05B 45/60 345/76 |
| 2011/0279420 | A1* | 11/2011 | Sung .................... | G09G 3/2011 345/204 |
| 2011/0285688 | A1* | 11/2011 | Miyake ................. | G11C 19/28 345/211 |
| 2012/0133626 | A1* | 5/2012 | Chung .................. | G09G 3/3648 345/208 |
| 2014/0119491 | A1* | 5/2014 | Liu ....................... | G11C 19/28 377/64 |
| 2016/0293092 | A1* | 10/2016 | Li ......................... | G09G 3/3266 |
| 2019/0333433 | A1* | 10/2019 | Zhu ...................... | G09G 3/20 |
| 2019/0355310 | A1* | 11/2019 | Kim ..................... | G09G 3/3266 |
| 2020/0394951 | A1* | 12/2020 | Li ......................... | G09G 3/20 |
| 2021/0358384 | A1* | 11/2021 | Liu ....................... | G09G 3/2092 |
| 2021/0407426 | A1* | 12/2021 | Zeng ..................... | G11C 19/28 |
| 2022/0343854 | A1* | 10/2022 | Li ......................... | H10D 86/421 |
| 2022/0383820 | A1* | 12/2022 | Zeng ..................... | G11C 19/28 |
| 2023/0037917 | A1* | 2/2023 | Xu ........................ | G09G 3/3266 |
| 2023/0177994 | A1* | 6/2023 | Jin ........................ | G11C 19/28 345/204 |
| 2023/0207031 | A1* | 6/2023 | Wang .................... | G09G 3/3233 345/204 |
| 2023/0260462 | A1* | 8/2023 | Chen ..................... | G09G 3/3266 345/214 |
| 2023/0410735 | A1* | 12/2023 | Xu ........................ | G11C 19/28 |

FOREIGN PATENT DOCUMENTS

| | | | | |
|---|---|---|---|---|
| CN | 108777129 | A | | 11/2018 |
| CN | 111681700 | A | | 9/2020 |
| CN | 113077832 | A | | 7/2021 |
| CN | 114038380 | A | | 2/2022 |
| KR | 20210049618 | A | | 5/2021 |
| WO | WO-2022062759 | A1 | * | 3/2022 ........... G09G 3/3225 |

* cited by examiner

In the first stage, a first clock signal is provided to the first signal terminal, a second clock signal is provided to the second signal terminal, and a third clock signal is provided to the third signal terminal so that, the input sub-circuit is turned on under the control of the signal at the first signal terminal, and the signal at the starting signal terminal is written into the first node; the first control sub-circuit is turned on under the control of the signal at the first node, and the signal at the first signal terminal is written into the second node; the second control sub-circuit remains the off state under the control of signals at the second node and the third signal terminal; the output sub-circuit is turned on under the control of signals at the first node and the second node, and signals at the second signal terminal and the second voltage terminal are written into the output terminal. — S100

At the second stage, the first clock signal is provided to the first signal terminal, the second clock signal is provided to the second signal terminal, and the third clock signal is provided to the third signal terminal. Accordingly, the input sub-circuit remains the off state under the control of the first clock signal; the first control sub-circuit is turned on under the control of the signal at the first node, and the signal at the first signal terminal is written into the second node; the second control sub-circuit remains the off state under the control of the signals at the third signal terminal and the second node; the output sub-circuit is turned on under the control of signals at the second node and the first node, and the signal at the second signal terminal is written into the output terminal — S200

FIG. 22

SCAN DRIVER CIRCUIT AND CONTROL METHOD THEREOF, DISPLAY PANEL, DISPLAY DEVICE

TECHNICAL FIELD

The present disclosure relates to the field of display technology, in particular to a scan driver circuit and a control method thereof, a display panel, and a display device.

BACKGROUND

The scan driver circuit is an important auxiliary circuit in AMOLED (Active Matrix Organic Light Emitting Diode) display. An existing scan driver circuit includes multiple cascaded shift registers. However, a display device provided with such a scan driver circuit has poor brightness uniformity.

SUMMARY

Embodiments of the present disclosure adopt technical solutions described below.

An aspect provides a scan driver circuit, including multiple clock signal lines and multiple cascaded shift registers; the shift register includes an input sub-circuit, a first control sub-circuit, a second control sub-circuit and an output sub-circuit. The input sub-circuit is connected to a starting signal terminal, a first node and a first signal terminal, and the input sub-circuit is configured to write a signal at the starting signal terminal into the first node under the control of the signal at the first signal terminal. The first control sub-circuit is connected to the first signal terminal, the second node, and the first node, and the first control sub-circuit is configured to write a signal at the first signal terminal into the second node under the control of the signal at the first node. The second control sub-circuit is connected to the first node, the second node, a second voltage terminal and a third signal terminal, and the second control sub-circuit is configured to write the signal at the second voltage terminal into the first node under the control of signals at the second node and the third signal terminal. The output sub-circuit is connected to the first node, the second node, an output terminal, a second signal terminal and the second voltage terminal, and the output sub-circuit is configured to write the signal at the second signal terminal into the output terminal under the control of the signal at the first node, and is also configured to write the signal at the second voltage terminal into the output terminal under the control of the signal at the first node. The second signal terminal and the third signal terminal of the same shift register are connected to different clock signal lines.

In some embodiments, the clock signal lines are divided into multiple clock signal line groups, and each of the clock signal line groups includes multiple clock signal lines; the multiple clock signal line groups include a first clock signal line group and a second clock signal line group. The third signal terminals in two cascaded shift registers are connected to different clock signal lines in the first clock signal line group, and the second signal terminals in the two cascaded shift registers are connected to different clock signal lines in the second clock signal line group.

In some embodiments, the first signal terminals in two cascaded shift registers are connected to different clock signal lines in the second clock signal line group, and the first signal terminal and the second signal terminal in the same shift register are connected to different clock signal lines in the second clock signal line group.

In some embodiments, the clock signal lines include a first clock signal line, a second clock signal line, a third clock signal line and a fourth clock signal line, and the shift registers comprise a first shift register and a second shift register in cascade. In the first shift register, the first signal terminal is connected to the first clock signal line, the second signal terminal is connected to the second clock signal line, and the third signal terminal is connected to the fourth clock signal line; in the second shift register, the first signal terminal is connected to the second clock signal line, the second signal terminal is connected to the first clock signal line, and the third signal terminal is connected to the third clock signal line.

In some embodiments, the shift registers include multiple first shift registers and multiple second shift registers, and the first shift registers and the second shift registers are alternatively arranged.

In some embodiments, the shift registers further include a fifth shift register and a sixth shift register, and the first shift register, the second shift register, the fifth shift register, and the sixth shift register are cascaded in sequence. In the fifth shift register, the first signal terminal is connected to the third clock signal line, the second signal terminal is connected to the fourth clock signal line, and the third signal terminal is connected to the second clock signal line; in the sixth shift register, the first signal terminal is connected to the fourth clock signal line, the second signal terminal is connected to the third clock signal line, and the third signal terminal is connected to the first clock signal line.

In some embodiments, the clock signal lines further include a fifth clock signal line and a sixth clock signal line, and the shift registers further comprise a third shift register and a fourth shift register, the first shift register, the second shift register, the third shift register, and the fourth shift register are arranged in sequence and connected in cascade. In the third shift register, the first signal terminal is connected to the fifth clock signal line, the second signal terminal is connected to the sixth clock signal line, and the third signal terminal is connected to the fourth clock signal line; in the fourth shift register, the first signal terminal is connected to the sixth clock signal line, the second signal terminal is connected to the fifth clock signal line, and the third signal terminal is connected to the third clock signal line.\

In some embodiments, the second control sub-circuit includes a sixth transistor and a seventh transistor. The sixth transistor includes a gate connected to the second node, a first electrode connected to the second voltage terminal, and a second electrode connected to the third node; the seventh transistor includes a gate connected to the third signal terminal, a first electrode connected to the third node, and a second electrode connected to the first node.

In some embodiments, the output sub-circuit includes a fourth transistor, a fifth transistor, a first capacitor and a second capacitor. The fourth transistor includes a gate connected to the second node, a first electrode connected to the second voltage terminal, and a second electrode connected to the output terminal; the fifth transistor includes a gate connected to the first node, a first electrode connected to the second signal terminal, and a second electrode connected to the output terminal; the first capacitor includes one plate connected to the second voltage terminal, and the other plate connected to the second node; the second capacitor includes one plate connected to the output terminal, and the other plate connected to the first node.

In some embodiments, the input sub-circuit includes a first transistor; the first transistor includes a gate connected to the first signal terminal, a first electrode connected to the starting signal terminal, and a second electrode connected to the first node.

In some embodiments, the first control sub-circuit includes a second transistor; the second transistor includes a gate connected to the first node, a first electrode connected to the first signal terminal, and a second electrode connected to the second node.

In some embodiments, the first control sub-circuit is also connected to a first voltage terminal, and the first control sub-circuit is further configured to write the signal at the first voltage terminal into the second node under the control of the signal at the first signal terminal.

In some embodiments, the first control sub-circuit includes a third transistor; the third transistor includes a gate connected to the first signal terminal, a first electrode connected to the first voltage terminal, and a second electrode connected to the second node.

Another aspect provides a display panel including the scan driver circuit and a plurality of pixel driving circuits, the output terminal of the scan driver circuit being connected to the pixel driving circuits.

Yet another aspect provides a display device including the display panel described above.

Yet another aspect provides a method for controlling the scan driver circuit described above, a same frame period includes a first stage and a second stage, and the method includes:
- at the first stage, providing a first clock signal to the first signal terminal, providing a second clock signal to the second signal terminal, and providing a third clock signal to the third signal terminal, so that the input sub-circuit is turned on under the control of the signal at the first signal terminal, and the signal at the starting signal terminal is written into the first node; the first control sub-circuit is turned on under the control of the signal at the first node, and the signal at the first signal terminal is written into the second node; the second control sub-circuit remains an off state under the control of signals at the second node and the third signal terminal; and the output sub-circuit is turned on under the control of signals at the first node and the second node, and signals at the second signal terminal and the second voltage terminal are written into the output terminal;
- at the second stage, providing the first clock signal to the first signal terminal, providing the second clock signal to the second signal terminal, and providing the third clock signal to the third signal terminal, so that the input sub-circuit remains the off state under the control of the first clock signal; the first control sub-circuit is turned on under the control of the signal at the first node, and the signal at the first signal terminal is written into the second node; the second control sub-circuit remains the off state under the control of the signals at the third signal terminal and the second node; and the output sub-circuit is turned on under the control of signals at the second node and the first node, and the signal at the second signal terminal is written into the output terminal.

In some embodiments, in the same frame period, an active level period of the second signal overlaps with an active level period of the third signal, and a leading edge of the active level in the second signal is ahead of the leading edge of the active level in the third signal.

In some embodiments, a duty cycle of the second signal is less than or equal to the duty cycle of the third signal.

The above explanation is merely an overview of technical solutions of the present disclosure. In order to make the technical means of the present disclosure be learned more clearly and make solutions of the present disclosure be implemented according to the contents of the specification, and in order to make the above-mentioned and other objects, features and advantages of the present disclosure more apparent and understandable, specific implementations of the present disclosure are set forth below.

BRIEF DESCRIPTION OF THE DRAWINGS

In order to describe technical solutions in embodiments of the present disclosure or the related art more clearly, the accompanying drawings which are used in the description of the embodiments or the related art will be briefly introduced. Apparently, the accompanying drawings in the following description illustrate some embodiments of the present disclosure, based on these accompanying drawings, those skilled in the art may obtain other accompanying drawings without paying any creative effort.

FIG. 22 is a block diagram schematically illustrating steps of a control method of a scan driver circuit.

DETAILED DESCRIPTION

In order to make objects, solutions and advantages of embodiments of the present disclosure clearer, a clear and thorough description for technical solutions in the embodiments of the present disclosure will be given below in conjunction with the accompanying drawings in the embodiments of the present disclosure. Apparently, the described embodiments are a part of embodiments of the present disclosure, not all the embodiments. All other embodiments obtained, based on the embodiments in the present disclosure, by those skilled in the art without paying creative effort fall within the protection scope of the present disclosure.

Unless it is otherwise defined in the context, throughout the specification and claims, the term "comprise" and other forms thereof, such as "comprises" and "comprising", are interpreted as open and inclusive meanings, that is, "comprising, but not limited to". In the description of the specification, the terms "an embodiment", "some embodiments", "an exemplary embodiment", "an example", "specific examples" or "some examples" are intended to indicate that specific features, structures, materials or characteristics related to the embodiment or example are included in at least one embodiment or example of the present disclosure. Schematic representations of the above terms do not necessarily referring to the same embodiment or example. Furthermore, the particular features, structures, materials or characteristics described may be included in any suitable manner in any one or more embodiments or examples.

In describing some embodiments, expressions such as "electrically connected" and "connected" and their derivatives may be used. For example, in some embodiments, the term "point connection" is used to indicate that two or more components are in a direct physical or electrical contact with each other. The embodiments disclosed herein are not necessarily limited by the contents here.

Hereinafter, the terms "first" and "second" are only used for descriptive purposes and cannot be understood as indicating or implying relative importance or implicitly indicating the quantity of indicated technical features. Therefore, features defined as "first" and "second" may explicitly or implicitly include one or more of these features. In the description of the embodiments of the present disclosure, unless otherwise specified, "plurality" means two or more.

Figure 1:
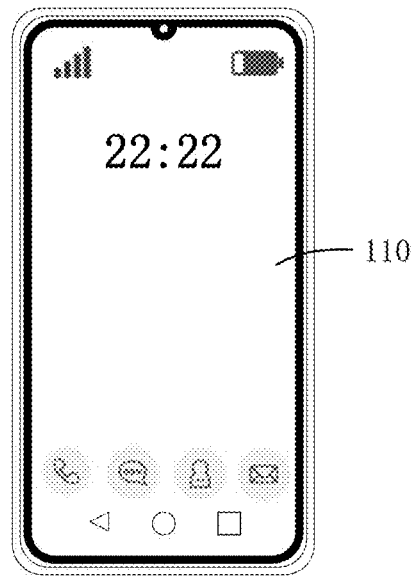
FIG. 1 is a schematic front view of a display device.

FIG. 1 is a schematic front view of a display device. As shown in FIG. 1, some embodiments of the present disclosure provide a display device 100, which may be any device that displays either moving text/images (e.g., videos) or fixed text/images (e.g., still images). More specifically, it is contemplated that the described embodiments may be implemented in or in connection with various electronic devices, including but not limited to mobile phones, wireless devices, personal data assistants (PDAs), handheld or portable computers, GPS receivers/navigators, cameras, MP4 video players, video cameras, game consoles, watches, clocks, calculators, TV monitors, Flat panel displays, computer monitors, automotive displays (e.g., odometer displays, etc.), navigational instrument, cockpit controllers and/or displays, camera view displays (e.g., rear-view camera displays in vehicles), electronic photographs, digital advertising displays or signs, projectors, architectural structures, packaging and aesthetic structures (for example, displays for images of a piece of jewelry). As an example, the display device 100 in FIG. 1 is a mobile phone.

The display device 100 includes a display panel 110. The display panel 110 may be a Liquid Crystal Display (LCD), and it may also be an electroluminescent display panel or a photoluminescent display panel. When the display panel 110 is an electroluminescent display panel, it may be an organic light emitting diode (OLED for short) display panel or a quantum dot light emitting diode (QLED for short) display panel. When the display panel 110 is a photoluminescent display panel, it may be a QLED display panel.

In some embodiments of the present disclosure, description is made by taking the display panel 110 being an organic light emitting diode (OLED for short) display panel as an example.

The display panel 110 may be provided with a scan driver circuit and a plurality of sub-pixels. The sub-pixel includes a pixel driving circuit and a light emitting device electrically connected to the pixel driving circuit. The scan driver circuit includes a plurality of clock signal lines and a plurality of cascaded shift registers, and the output ends of the shift registers are electrically connected to the pixel driving circuit. When the display panel 110 is operated, a clock signal may pass through each clock signal line to control the shift register to output scanning signals step by step. The pixel driving circuit is configured to, under the control of the scanning signals, drive the light emitting device to emit light.

Figure 2:
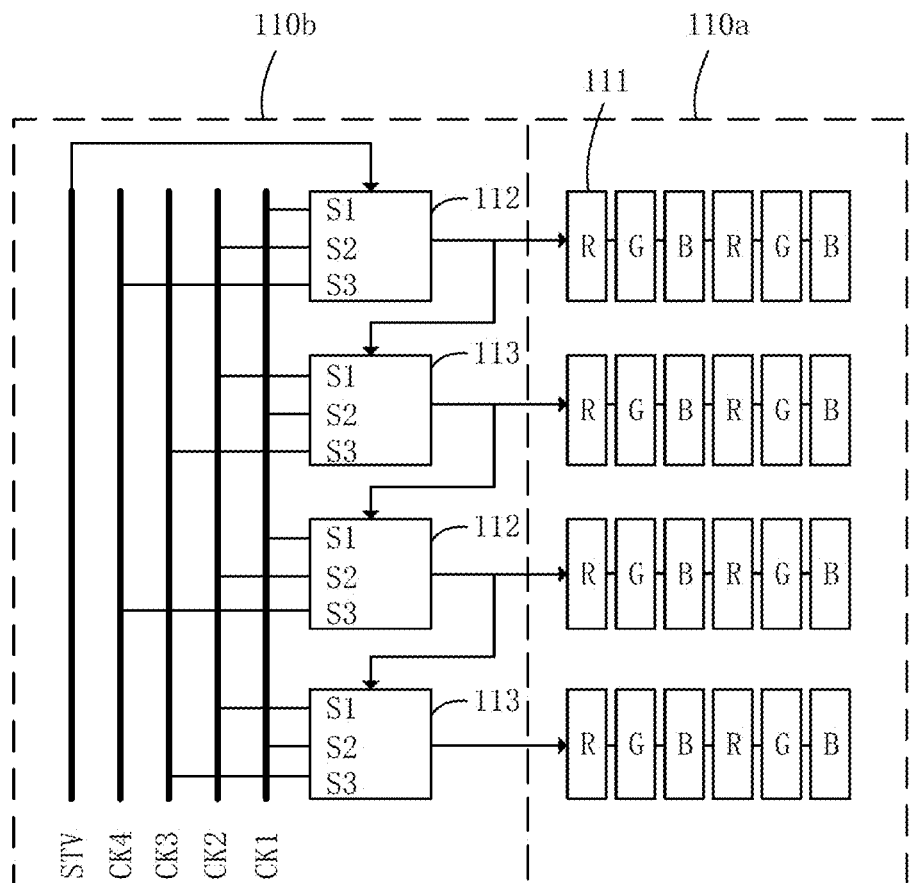
FIG. 2 is a schematic structural block diagram of a display panel.

FIG. 2 is a schematic structural block diagram of a display panel. For example, as shown in FIG. 2, the display panel 110 may be divided into a display area 110a and a non-display area 110b connected to the display area 110a. A plurality of sub-pixels 111 are provided in the display area 110a, and a scan driver circuit is provided in the non-display area 110b. In actual application, without doubt, at least part of the structure of the scan driver circuit may also be disposed in the display area 110a so as to reduce the bezel size of the display panel 110.

For example, continuing to refer to FIG. 2, the plurality of sub-pixels 111 are arranged in an array to form multiple rows of sub-pixels 111, and the output end of each shift register is electrically connected to the pixel driving circuit in one row of sub-pixels 111.

Figure 3:
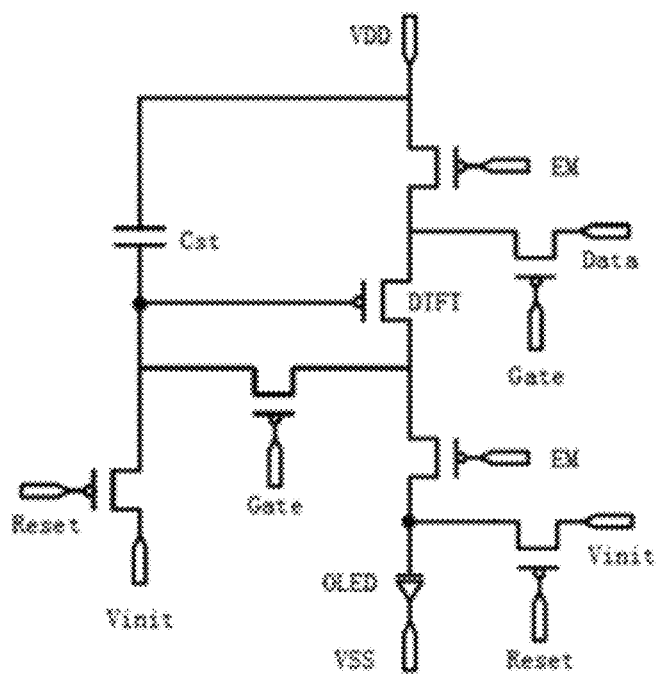
FIG. 3 is a schematic circuit diagram of a pixel driving circuit.

FIG. 3 is a schematic circuit diagram of a pixel driving circuit. As shown in FIG. 3, the pixel driving circuit includes a light emitting control terminal EM, a data writing control signal terminal Gate, and a reset control signal terminal Reset. The pixel driving circuit is configured to, under the control of signals from the light emitting control terminal EM, the data writing control signal terminal Gate, and the reset control signal terminal Reset, drive the light emitting device OLED to emit light.

The output terminal of the shift register may be electrically connected to the data writing control signal terminal Gate and/or the reset control signal terminal Reset, and may also be electrically connected to the light emitting control terminal EM. A schematic explanation is made below merely by taking the output terminal of the shift register being electrically connected to the data writing control signal terminal Gate and/or the reset control signal terminal Reset as an example.

A pixel driving circuit with a 7T1C structure is shown in FIG. 3 as an example. In actual application, the pixel driving circuit may also adopt other structures such as 4T1C, 6T1C, 6T2C, 7T2C, and 8T2C. The structure of the pixel driving circuit is not limited in the embodiments of the present disclosure. Among them, T represents a transistor, the figure in front of T represents the number of transistors, C represents a capacitor, and the figure in front of C represents the number of capacitors.

Figure 4:
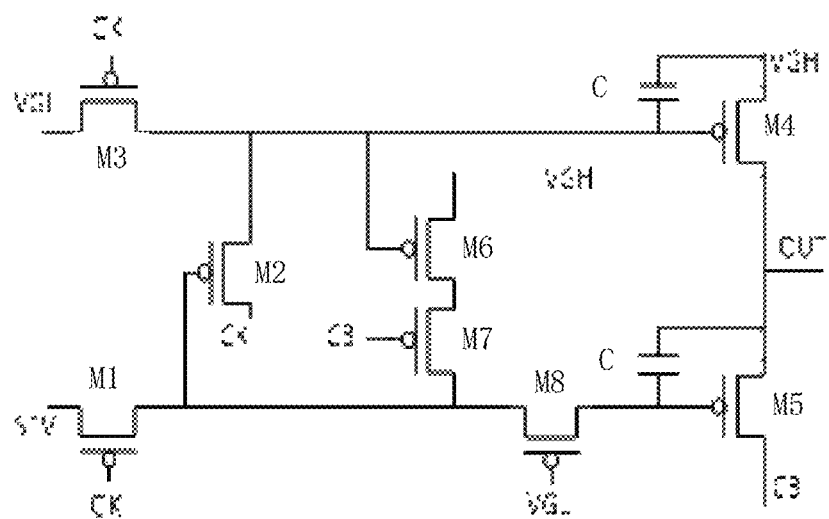
FIG. 4 is a circuit diagram of a shift register in the related art.
Figure 5:
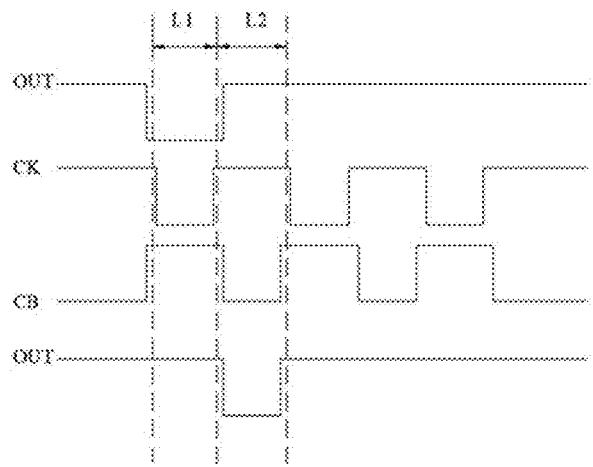
FIG. 5 is a working timing diagram of the shift register shown in FIG. 4.

FIG. 4 is a circuit diagram of a shift register in the related art; FIG. 5 is a working timing diagram of the shift register shown in FIG. 4. As shown in FIG. 4 and FIG. 5, the working process of the shift register in the related art includes: at stage L1, a first clock signal terminal CK is at low level, a second clock signal terminal CB is at high level, the transistor M1, the transistor M8 and the transistor M5 are turned on, and a signal output terminal OUT outputs a high level signal; at stage L2, the first clock signal terminal CK is at high level, the second clock signal terminal CB is at low level, the gate of the transistor M5 remains at a low level state, and the shift register outputs a low level signal through the transistor M5.

As can be seen from FIG. 3 to FIG. 5, the luminous brightness of the light emitting device OLED is relatively sensitive to the signal rising time/falling time (Tr/Tf) of the data writing control signal terminal Gate and the reset control terminal Reset. The signals of the data writing control terminal Gate and the reset control terminal Reset are shifted outputs of the second clock signal terminal CB signal, and the loading of the signal line connected to the second clock signal terminal CB will directly affect the rising time/falling time (Tr/Tf) of the second clock signal terminal CB. Since the second clock signal terminal CB is connected to both the transistor M5 and the transistor M7, the load of the second clock signal terminal CB is relatively large, resulting in a long time for the second clock signal terminal CB to be switched from a high level to a low level (a long time is required for the signal output terminal OUT to be switched from a high level to a low level), that is, the falling edge time Tf is larger. As a result, a difference in the rising edge time and falling edge time of the data writing control terminal Gate and the reset control terminal Reset signal occurs, resulting in display defects.

In view of this, in the scan driver circuit provided by some embodiments of the present disclosure, the falling edge of the signal output by the output terminal of the shift register is smaller, thereby improving display defects.

Figure 6:
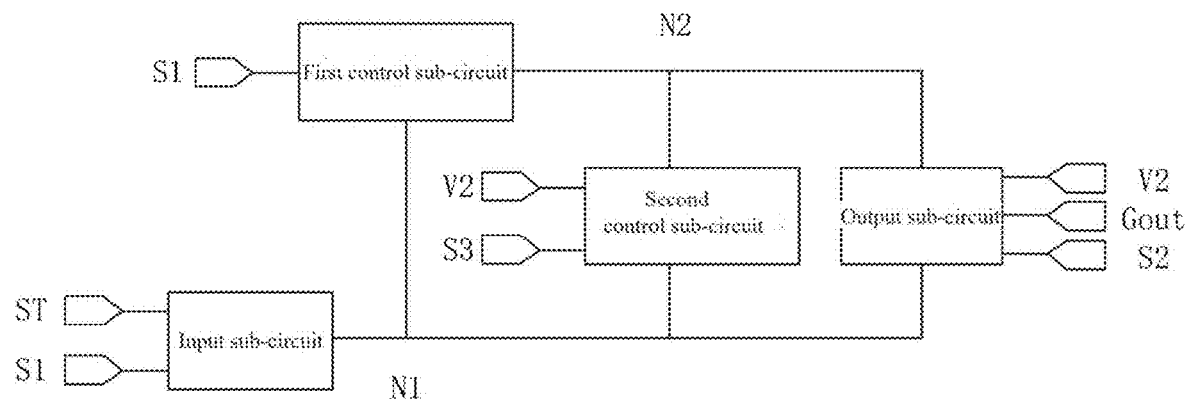
FIG. 6 is a schematic structural block diagram of a shift register.

FIG. 6 is a schematic structural block diagram of a shift register. As shown in FIG. 6, the shift register includes an input sub-circuit, a first control sub-circuit, a second control sub-circuit and an output sub-circuit.

The input sub-circuit is connected to a starting signal terminal ST, a first node N1, and a first signal terminal S1. The input sub-circuit is configured to write the signal at the starting signal terminal ST into the first Node N1 under the control of the signal at the first signal terminal S1.

As an example, when the signal received by the first signal terminal S1 is a low level signal, the input sub-circuit is turned on and writes the signal at the starting signal terminal ST into the first node N1. For example, after the input sub-circuit is turned on, a low level signal is obtained at the first node N1 when the signal at the starting signal terminal ST is a low level signal, and a high level signal is obtained at the first node N1 when the signal at the starting signal terminal ST is a high level signal.

The first control sub-circuit is connected to the first signal terminal S1, the first node N1, and a second node N2. The first control sub-circuit is configured to write the signal at the first signal terminal S1 into the second node N2 under the control of the signal at the first node N1.

As an example, when the signal at the first node N1 is a low level signal, the first control sub-circuit is turned on and writes the signal at the first signal terminal S1 into the second node N2. For example, after the first control sub-circuit is turned on, a low level signal is obtained at the second node N2 when the signal at the first signal terminal S1 is a low level signal, and a high level signal is obtained at the second node N2 when the signal at the first signal terminal S1 is a high level signal.

Figure 7:
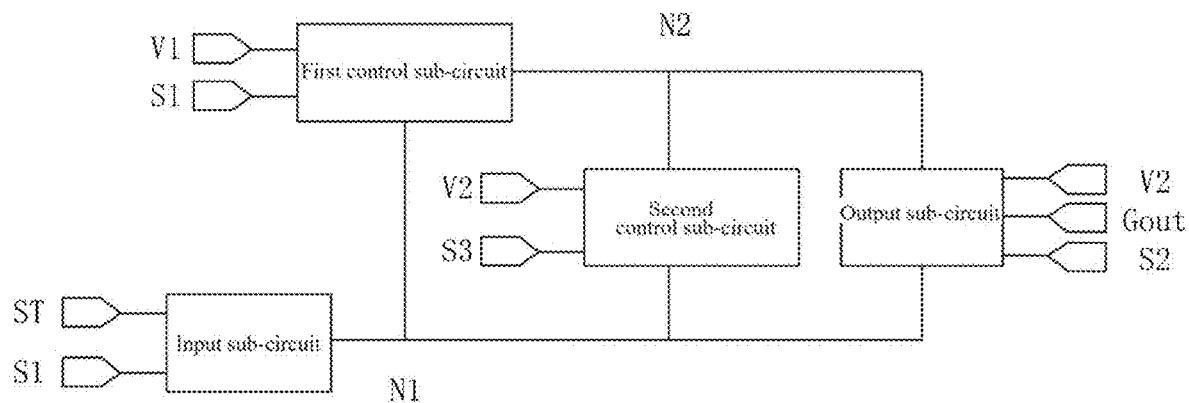
FIG. 7 is a schematic structural block diagram of another shift register.

FIG. 7 is a schematic structural block diagram of another shift register. Optionally, as shown in FIG. 7, the first control sub-circuit may also be connected to a first voltage terminal V1, and the first control sub-circuit is further configured to write the signal at the first voltage terminal V1 to the second node N2 under the control of the signal at the first signal terminal S1.

For example, when the signal at the first signal terminal S1 is a low level signal, the first control sub-circuit writes the signal at the first voltage terminal V1 into the second node N2.

The first voltage terminal V1 is configured to provide a low level signal (for example, lower than or equal to the low level part of the clock signal in the clock signal line). For example, the first voltage terminal V1 is connected to the Vgl line.

The second control sub-circuit is connected to the first node N1, the second node N2, a second voltage terminal V2, and a third signal terminal S3. The second control sub-circuit is configured to write the signal at the second voltage terminal V2 into the first node N1 under the control of signals at the second node N2 and the third signal terminal S3.

For example, when the signals at the second node N2 and the third signal terminal S3 are both low level signals, the second control sub-circuit is turned on and writes the signal at the second voltage terminal V2 into the first node N1.

The second voltage terminal V2 is configured to provide a DC high level signal (for example, higher than or equal to the high level part of the clock signal in the clock signal line).

For example, the second voltage terminal V2 is connected to the Vgh line.

The output sub-circuit is connected to the first node N1, the second node N2, the output terminal Gout, a second signal terminal S2, and a second voltage terminal V2. The output sub-circuit is configured to write the signal at the second signal terminal S2 into the output terminal Gout under the control of the signal at the first node N1, and is further configured to write the signal at the second voltage terminal V2 into the output terminal Gout under the control of the signal at the first node N1.

For example, when the signals at the first node N1 and the second node N2 are both low level signals, the second voltage terminal V2 is connected to the output terminal Gout, and the second signal terminal S2 is connected to the output terminal Gout; when the signal at the first node N1 is a low level signal and the signal at the second node N2 is a high level signal, the second voltage terminal V2 is disconnected from the output terminal Gout, and the second signal terminal S2 is connected to the output terminal Gout.

Optionally, the shift register further includes a stabilizing sub-circuit connected to the first voltage terminal V1, the first node N1, and a fourth node N4. The stabilizing sub-circuit is configured to, under the control of the signal at the first voltage terminal V1, write the signal at the first node N1 into the fourth node N4, or write the signal at the fourth node N4 into the first node N1.

When the shift register includes the stabilizing sub-circuit, the output sub-circuit is connected to the first node N1 through the stabilizing sub-circuit.

The nodes in the embodiments of the present disclosure (for example, the first node N1, the second node N2, the third node N3, the fourth node N4, etc.) do not represent actual existing components, but represent junction points of relevant electrical connections in the circuit diagram, that is, these nodes are obtained by an equivalent of the junction points of related electrical connections in a circuit diagram.

For example, continuing to refer to FIG. 2, after multiple shift registers are connected in cascade, the starting signal terminal ST of the first shift register is connected to a starting signal line STV, and the starting signal terminals ST of the remaining shift registers are connected to the output terminal Gout of a previous shift register.

The same frame period includes a first stage and a second stage.

At the first stage, the input sub-circuit writes the signal at the starting signal terminal ST into the first node N1 under the control of the signal at the first signal terminal S1, and the output sub-circuit writes the signal at the second signal terminal S2 into the output terminal Gout under the control of the signal at the first node N1, so that the shift register outputs the signal at the second signal terminal S2 through the output terminal Gout. The first control sub-circuit writes the signal at the first signal terminal S1 into the second node N2 under the control of the signal at the first node N1, and the output sub-circuit writes the signal at the second voltage terminal V2 into the output terminal Gout under the control of the signal at the second node N2, so that the shift register outputs the signal at the second voltage terminal V2 through the output terminal Gout. Moreover, the second control sub-circuit is non-conductive under the control of signals at the second node N2 and the third signal terminal S3, so that the first node N1 is disconnected from the second node N2.

At the second stage, the output sub-circuit writes the signal at the second signal terminal S2 into the output terminal Gout under the control of the signal at the first node N1, so that the shift register outputs the signal at the second signal terminal S2 through the output terminal Gout. The first control sub-circuit writes the signal at the first signal terminal S1 into the second node N2 under the control of the signal at the first node N1. Moreover, the second control sub-circuit is non-conductive under the control of signals at the second node N2 and the third signal terminal S3, so that the first node N1 is disconnected from the second node N2.

For example, at the first stage, the signal at the first signal terminal S1 is a low level signal, and the signal at the second signal terminal S2 is a high level signal; at the second stage, the signal at the first signal terminal S1 is a high level signal, and the signal at the second signal terminal S2 is a low level signal. The shift register is enabled to output a high level signal at the first stage and output a low level signal at the second stage.

The second signal terminal S2 and the third signal terminal S3 of the same shift register are connected to different clock signal lines. That is, in the same shift register, the clock signal line connected to the second signal terminal S2 is connected to the output sub-circuit and not to the second control sub-circuit, which reduces the load of the clock signal line connected to the second signal terminal S2. In response to the load of the clock signal line connected to the second signal terminal S2 being reduced, the time required for switching the signal at the second signal terminal S2 from a high level to a low level is shorter (the time required for switching the output terminal Gout from a high level to a low level is shorter). That is, the falling edge time Tf of the signal output by the shift register is smaller, thereby reducing the difference between the rising edge time and falling edge time of signals at the data writing control terminal Gate and the reset control terminal Reset, and improving the display defects.

Figure 8:
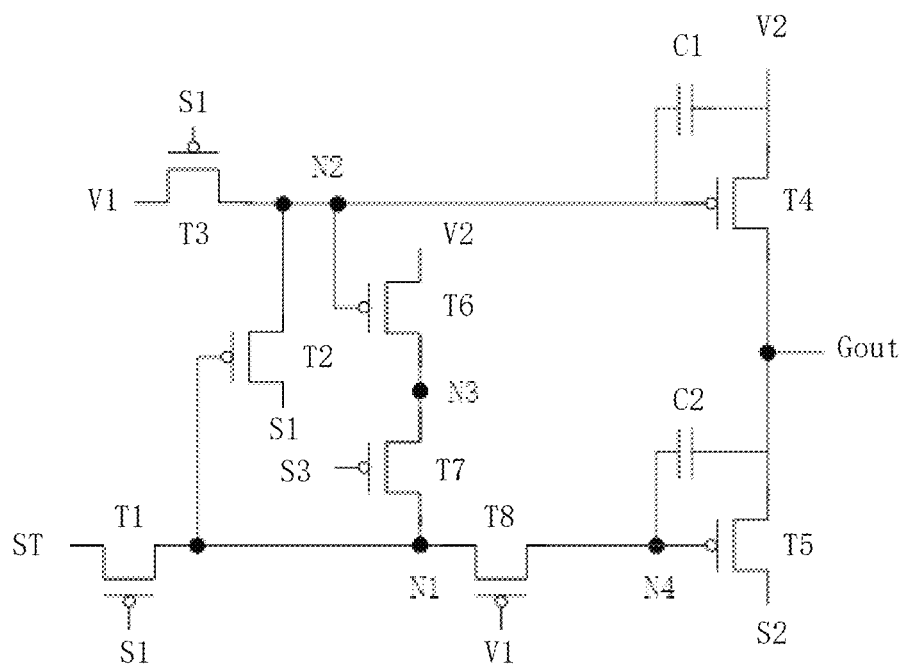
FIG. 8 is a schematic circuit diagram of a shift register.

FIG. 8 is a schematic circuit diagram of a shift register. A shift register provided by an embodiment of the present disclosure will be described in detail below with reference to FIG. 8.

In some embodiments, the input sub-circuit includes a first transistor T1. The control electrode of the first transistor T1 is connected to the first signal terminal S1, the first electrode of the first transistor T1 is connected to the starting signal terminal ST, and the second electrode of the first transistor T1 is connected to the first node N1. The first transistor T1 is configured to, at the first stage, write the signal at the starting signal terminal ST into the first node N1 in response to the signal at the first signal terminal S1.

In some embodiments, the first control sub-circuit includes a second transistor T2. The control electrode of the second transistor T2 is connected to the first node N1, the first electrode of the second transistor T2 is connected to the first signal terminal S1, and the second electrode of the second transistor T2 is connected to the second node N2. The second transistor T2 is configured to, at the first stage and the second stage, write the signal at the first signal terminal S1 into the second node N2 in response to the signal at the first node N1.

The first control sub-circuit may also include a third transistor T3. The control electrode of the third transistor T3 is connected to the first signal terminal S1, the first electrode of the third transistor T3 is connected to the first voltage terminal V1, and the second electrode of the third transistor T3 is connected to the second node N2. The third transistor T3 is configured to, at the first stage, write the signal at the first voltage terminal V1 into the second node N2 in response to the signal at the first signal terminal S1.

In some embodiments, the second control sub-circuit includes a sixth transistor T6 and a seventh transistor T7.

The control electrode of the sixth transistor T6 is connected to the second node N2, the first electrode of the sixth transistor T6 is connected to the second voltage terminal V2, and the second electrode of the sixth transistor T6 is connected to the third node N3. The sixth transistor T6 is configured to write the signal at the second voltage terminal V2 into the third node N3 in response to the signal at the second node N2.

The control electrode of the seventh transistor T7 is connected to the third signal terminal S3, the first electrode of the seventh transistor T7 is connected to the third node N3, and the second electrode of the seventh transistor T7 is connected to the first node N1. The seventh transistor T7 is configured to write the signal at the third node N3 into the first node N1 in response to the signal at the third signal terminal S3.

In some embodiments, the output sub-circuit includes a fourth transistor T4, a fifth transistor T5, a first capacitor C1 and a second capacitor C2.

The control electrode of the fourth transistor T4 is connected to the second node N2, the first electrode of the fourth transistor T4 is connected to the second voltage terminal V2, and the second electrode of the fourth transistor T4 is connected to the output terminal Gout. The fourth transistor T4 is configured to, at the first stage, write the signal at the second voltage terminal V2 into the output terminal Gout in response to the signal at the second node N2; the fourth transistor T4 is also configured to, at the second stage, disconnect the second voltage terminal V2 from the output terminal Gout in response to the signal at the second node N2.

The control electrode of the fifth transistor T5 is connected to the first node N1, the first electrode of the fifth transistor T5 is connected to the second signal terminal S2, and the second electrode of the fifth transistor T5 is connected to the output terminal Gout. The fifth transistor T5 is configured to write the signal at the second signal terminal S2 into the output terminal Gout in response to the signal at the first node N1.

One plate of the first capacitor C1 is connected to the second voltage terminal V2, and the other plate is connected to the second node N2. The first capacitor C1 is configured to store the signal at the second node N2 so that the signal at the second node N2 does not undergo a sudden change.

One plate of the second capacitor C2 is connected to the output terminal Gout, and the other plate is connected to the first node N1. The second capacitor C2 is configured to store the signal at the first node N1 so that the signal at the first node N1 does not undergo a sudden change.

In some embodiments, the stabilizing sub-circuit includes an eighth transistor T8. The control electrode of the eighth transistor T8 is connected to the first voltage terminal V1, the first electrode of the eighth transistor T8 is connected to the first node N1, and the second electrode of the eighth transistor T8 is connected to the fourth node N4. The eighth transistor T8 is configured to, in response to the signal at the first voltage terminal V1, write the signal at the first node N1 into the fourth node N4, or write the signal at the fourth node N4 into the first node N1.

When the shift register includes the stabilizing sub-circuit, the control electrode of the fifth transistor T5 is connected to the fourth node N4, so that the control electrode of the fifth transistor T5 is connected to the first node N1 through the eighth transistor T8; the other plate of the second capacitor C2 is connected to the fourth node N4, so that the other plate of the second capacitor C2 is connected to the first node N1 through the eighth transistor T8.

The transistors used in the circuits provided by the embodiments of the present disclosure may be thin film transistors, field effect transistors (for example oxide thin film transistors), or other switching devices with the same characteristics. In the embodiments of the present disclosure, thin film transistors are used as an example for explanation.

In some embodiments, for each transistor used in the shift register, the control electrode is the gate of the transistor, the first electrode is one of the source and the drain of the transistor, and the second electrode is the other of the source and the drain of the transistor. Since the source and drain of the transistor may be symmetrical in structures, the source and drain of the transistor may be the same in structures, that is to say, the first electrode and the second electrode of the transistor in the embodiment of the present disclosure may be the same in structures. As an example, when the transistor is a P-type transistor, the first electrode of the transistor is the source, and the second electrode is the drain. As another example, when the transistor is an N-type transistor, the first electrode of the transistor is the drain, and the second electrode is the source.

A schematic explanation is described by taking all the transistors provided in the embodiments of the present disclosure being P-type transistors as an example.

Figure 9:
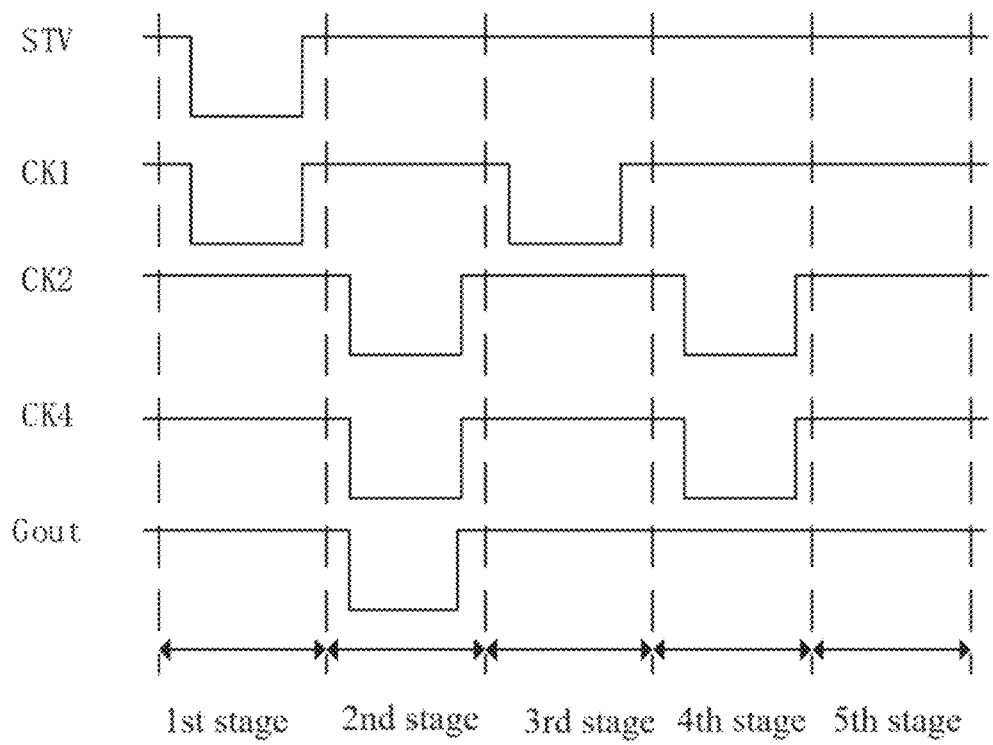
FIG. 9 is a diagram schematically illustrating a working timing sequence of a shift register.

For example, for the first shift register among multiple cascaded shift registers, the first signal terminal S1 is connected to the first clock signal line CK1, the second signal terminal S2 is connected to the second clock signal line CK2, the third signal terminal S3 is connected to the fourth clock signal line CK4, and the starting signal terminal ST is connected to the starting signal line STV. FIG. 9 is a diagram schematically illustrating a working timing sequence of a shift register. The working process of the shift register will be described in detail below with reference to FIG. 8 and FIG. 9 by taking the first shift register as an example.

At the first stage, signals at the first signal terminal S1 and the starting signal terminal ST are both low level (active level), and the signal at the second signal terminal S2 is high level (inactive level). The first transistor T1 is turned on under the control of the low level signal at the first signal terminal S1, the low level signal at the starting signal terminal ST is written into the first node N1 through the first transistor T1. The eighth transistor T8 is turned on under the control of the low level signal at the first voltage terminal V1, and the low level signal written to the first node N1 continues to be written into the fourth node N4, so that the fifth transistor T5 is enabled to be turned on, and the high level signal at the second signal terminal S2 is written into the output terminal Gout through the fifth transistor T5. Moreover, the second transistor T2 is turned on under the control of the low level signal at the first node N1, the low level signal at the first signal terminal S1 is written into the second node N2 through the second transistor T2, and the third transistor T3 is turned on under the control of the low level signal at the voltage terminal V1, so that the low level signal at the first voltage terminal V1 is written into the second node N2. The fourth transistor T4 is turned on under the control of the low level signal at the second node N2, so that the high level signal at the second voltage terminal V2 is written into the output terminal Gout through the fourth transistor T4. At this time, the output terminal Gout of the shift register outputs a high level signal.

At the second stage, the signals at the first signal terminal S1 and the starting signal terminal ST are both high level signals (inactive level), and the signal at the second signal terminal S2 is a low level signal (active level). The fourth node N4 may maintain the low level signal at the first stage (under the action of the second capacitor C2), the fifth transistor T5 remains the on state. After the signal at the second signal terminal S2 is switched from a high level signal to a low level signal, the low level signal at the second signal terminal S2 is written into the output terminal Gout through the fifth transistor T5. Moreover, the first node N1 may maintain the low level signal at the first stage (under the action of the second capacitor C2), so that the second transistor T2 is turned on, and the high level signal at the first signal terminal S1 is written into the second node N2 through the second transistor T2. As a result, the potential at the second node N2 is pulled high, so that the fourth transistor T4 and the sixth transistor T6 are turned off. At this time, the shift register outputs a low level signal through the output terminal Gout.

At the third stage, the signal at the first signal terminal S1 is a low level signal (active level), and the signals at the starting signal terminal ST and the second signal terminal S2 are both high level signals (inactive level). The first transistor T1 is turned on under the control of the low level signal at the first signal terminal S1, the high level signal at the starting signal terminal ST is written into the first node N1 through the first transistor T1. The eighth transistor T8 is turned on under the control of the low level signal at the first voltage terminal V1, so that the high level signal written into the first node N1 continues to be written into the fourth node N4. As a result, the fifth transistor T5 is turned off under the control of the high level signal at the fourth node N4. Moreover, the second transistor T2 is turned off under the control of the high level signal at the first node N1, the third transistor T3 is turned on under the control of the low level signal at the first signal terminal S1, the low level signal at the first voltage terminal V1 is written into the second node N2 through the third transistor T3, and the fourth transistor T4 is turned on under the control of the low level signal at the second node N2, so that the high level signal at the second voltage terminal V2 is written into the output terminal Gout through the fourth transistor T4. At this time, the output terminal Gout of the shift register outputs a high level signal.

At the fourth stage, the signals at the first signal terminal S1 and the starting signal terminal ST are both high level signals (inactive level), and the signal at the second signal terminal S2 is a low level signal (active level). The first node N1 and the fourth node N4 maintain the high level signal of the third stage (under the action of the second capacitor C2), and the second transistor T2 and the fifth transistor T5 remain the off state under the control of the high level signal. The second node N2 maintains the low level signal of the third stage (under the action of the first capacitor C1), so that the fourth transistor T4 remains the on state under the control of the low level signal at the second node N2, and the high level signal at the second voltage terminal V2 is written into the output terminal Gout through the fourth transistor T4. At this time, the output terminal Gout of the shift register outputs a high level signal.

At the fifth stage, the signal at the first signal terminal S1 is a low level signal (active level), and the signals at the starting signal terminal ST and the second signal terminal S2 are both high level signals (inactive level). The first transistor T1 is turned on under the control of the low level signal at the first signal terminal S1, and the high level signal at the starting signal terminal ST is written into the first node N1 through the first transistor T1, and then written into the fourth node N4, so that the fifth transistor T5 is turned off under the control of the high level signal at the fourth node N4. Moreover, the second transistor T3 is turned on under the control of the low level signal at the first signal terminal S1, the low level signal at the first voltage terminal V1 is written into the second node N2 through the third transistor T3, and the fourth transistor T4 is turned on under the control of the low level signal at the second node N2, so that the high level signal at the second voltage terminal V2 is written into the output terminal Gout through the fourth transistor T4. At this time, the output terminal Gout of the shift register outputs a high level signal.

In the scan driver circuit of the related art, the transistor M5 and the transistor M7 of the same shift register are connected to the second clock signal terminal CB, and the second clock signal terminal CB is connected to a clock signal line. When the signal at the second clock signal terminal CB is a low level signal, the transistor M7 is turned on, and a parasitic capacitance is formed between the gate of the transistor M7 and the active layer of the transistor M7. When the signal in the clock signal line connected to the second clock signal terminal CB switches between a high level signal and a low level signal, the time for switching between the high level signal and the low level signal increases due to the parasitic capacitance, that is, the falling edge time Tf of the output signal of the shift register is larger. As a result, a difference between the rising edge time and falling edge time of the signal at the data writing control terminal Gate and the reset control terminal Reset is large, which easily leads to display defects.

In the embodiment of the present disclosure, the second signal terminal S2 and the third signal terminal S3 of the same shift register are connected to different clock signal lines. That is, in the same shift register, the fifth transistor T5 and the seventh transistor T7 are connected to different clock signal lines, thereby reducing the load of the clock signal line connected to the fifth transistor T5. When the signal in the clock signal line connected to the fifth transistor T5 switches between the high level and the low level, the time for switching between the high level signal and the low level signal is reduced (the time required for the output terminal Gout to switch from the high level to the low level is shorter), that is, the falling edge time Tf of the output signal of the shift register is shorter. Accordingly, the difference between the rising edge time and the falling edge time of the data writing control terminal Gate and the reset control terminal Reset signal is reduced, and the display defects are improved.

In addition, since the second signal terminal S2 and the third signal terminal S3 in the same shift register are connected to different clock signal lines, the time at which the seventh transistor T7 in the shift register is turned on or turned off is controlled through the clock signal line connected to the third signal terminal S3.

Figure 10:
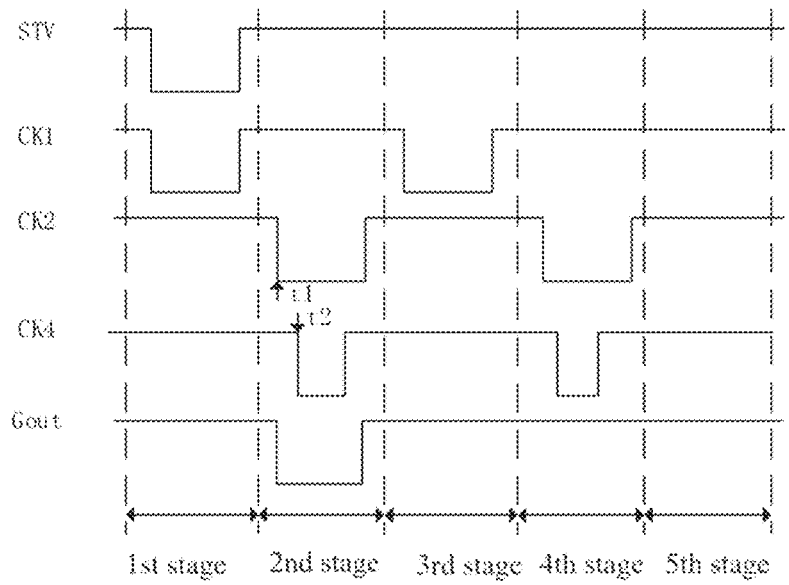
FIG. 10 is a diagram schematically illustrating another working timing sequence of a shift register.

FIG. 10 is a diagram schematically illustrating another working timing sequence of a shift register. For example, as shown in FIG. 10, for the first shift register, the first signal terminal S1 is connected to the first clock signal line CK1, the second signal terminal S2 is connected to the second clock signal line CK2, the third signal terminal S3 is connected to the fourth clock signal line CK4, and the starting signal terminal ST is connected to the starting signal line STV. The time when the signal at the third signal terminal S3 switches from a high level signal to a low level signal is a first time t1, and the time when the signal at the second signal terminal S2 switches from a high level signal to a low level signal is a second time t2, the first time t1 is earlier than the second time t2.

At the second stage, during a period from the first time t1 to the second time t2, the signal at the second signal terminal S2 switches to a low level signal, and the fourth node N4 and the first node N1 remain at low level under the action of the second capacitor C2, causing the fifth transistor T5 and the second transistor T2 to be turned on. At this time, the signal at the third signal terminal S3 is still a high level signal, the seventh transistor T7 is not turned on. Therefore, the charges stored in the second capacitor C2 will not be released to the third node N3 through the seventh transistor T7, nor will the parasitic capacitance formed between the gate and the active layer of the seventh transistor T7 be charged, so that the first node N1 and the fourth node N4 maintain a low level signal, thereby making the on-state of the fifth transistor T5 and the second transistor T2 relatively good. The charges stored in the second capacitor C2 are prevented from being released through the seventh transistor T7, so that the potential at the fourth node N4 increases, thereby affecting the output of the shift register.

The plurality of clock signal lines in the scan driver circuit may be divided into multiple clock signal line groups. Each clock signal line group includes multiple clock signal lines, and each clock signal line may only belong to one clock signal line group. The multiple clock signal line groups include a first clock signal line group and a second signal line group.

Exemplarily, the clock signal lines connected to the third signal terminal S3 are divided into the first clock signal line group, and the clock signal lines, among the plurality of clock signal lines, except the clock signal lines in the first clock signal line group are divided into the second clock signal line group.

The clock signal lines in the first clock signal line group are connected to the third signal terminal S3 of the shift register, and at least part of the clock signal lines in the second clock signal line group are connected to the second signal terminal S2. That is to say, the clock signal line connected to the second signal terminal S2 is not connected to the third signal terminal S3, so that the load of the clock signal line connected to the second signal terminal S2 is reduced. When the signal in the clock signal line connected to the second signal terminal S2 switches between the high level and the low level, the time for switching between the high level signal and the low level signal is reduced (the time required for the output terminal Gout to switch from the high level to the low level is shorter), that is, the falling edge time Tf of the output signal of the shift register is short. Accordingly, the difference between the rising edge time and falling edge time of signals at the data writing control terminal Gate and the reset control terminal Reset is reduced, and display defects are improved.

Exemplarily, the second clock signal line group includes a first sub-clock signal line group and a second sub-clock signal line group. When the clock signal line in the first sub-clock signal line group is at an active level, the clock signal line in the second sub-clock signal line group is at an inactive level; when the clock signal line in the second sub-clock signal line group is at an active level, the clock signal line in the first sub-clock signal line group is at an inactive level. In the same shift register, the clock signal line connected to the first signal terminal S1 belongs to one of the first sub-clock signal line group and the second sub-clock signal line group, and the clock signal line connected to the second signal terminal S2 belongs to the other one of the first sub-clock signal line group and the second sub-clock signal line group.

The third signal terminals S3 in two cascaded shift registers are connected to different clock signal lines in the first clock signal line CK1 group, so that the third signal terminal S3 in one of the shift registers is at an active level, and the third signal terminal S3 in the other shift register is at an inactive level. The second signal terminals S2 in two cascaded shift registers are connected to different clock signal lines in the second clock signal line group, so that the second signal terminal S2 in one of the shift registers is at an active level, and the second signal terminal S2 in the other shift register is at an inactive level.

The first signal terminal S1 in the shift register may also be connected to the clock signal line in the second clock signal line group. That is, the first signal terminal S1 and the second signal terminal S2 are both connected to the clock signal lines in the second clock signal line group, and the clock signal lines in the first clock signal line group are not connected to the first signal terminal S1 and the second signal terminal S2. If the time when the clock signal line in the first clock signal line group switches between the high level and the low level is late, the time when the signal at the first signal terminal S1 and/or the second signal terminal S2 switches between the high level and the low level will not be late.

The first signal terminals S1 in two cascaded shift registers are connected to different clock signal lines in the second clock signal line group, so that the first signal terminal S1 in one of the shift registers is at an active level, and the first signal terminal S1 in the other shift register is at an inactive level. In the same shift register, the first signal terminal S1 and the second signal terminal S2 are connected to different clock signal lines in the second clock signal line group, so that one of the first signal terminal S1 and the second signal terminal S2 in the same shift register is at an active level, and the other is at an inactive level.

To be sure, the clock signal lines in the first clock signal group may also be connected to the first signal terminal S1 and the second signal terminal S2.

The clock signal lines include the first clock signal line CK1, the second clock signal line CK2, the third clock signal line CK3 and the fourth clock signal line CK4. The plurality of shift registers include cascaded first shift register 112 and second shift register 113. The first shift register 112 and the second shift register 113 may be any two cascaded shift registers among the plurality of shift registers. The output terminal Gout of the first shift register 112 may be connected to the starting signal terminal ST of the second shift register 113, or the output terminal Gout of the second shift register 113 may be connected to the starting signal terminal ST of the first shift register 112. A schematic explanation is described below only by taking the output terminal Gout of the first shift register 112 being connected to the starting signal terminal ST of the second shift register 113 as an example.

Figure 11:
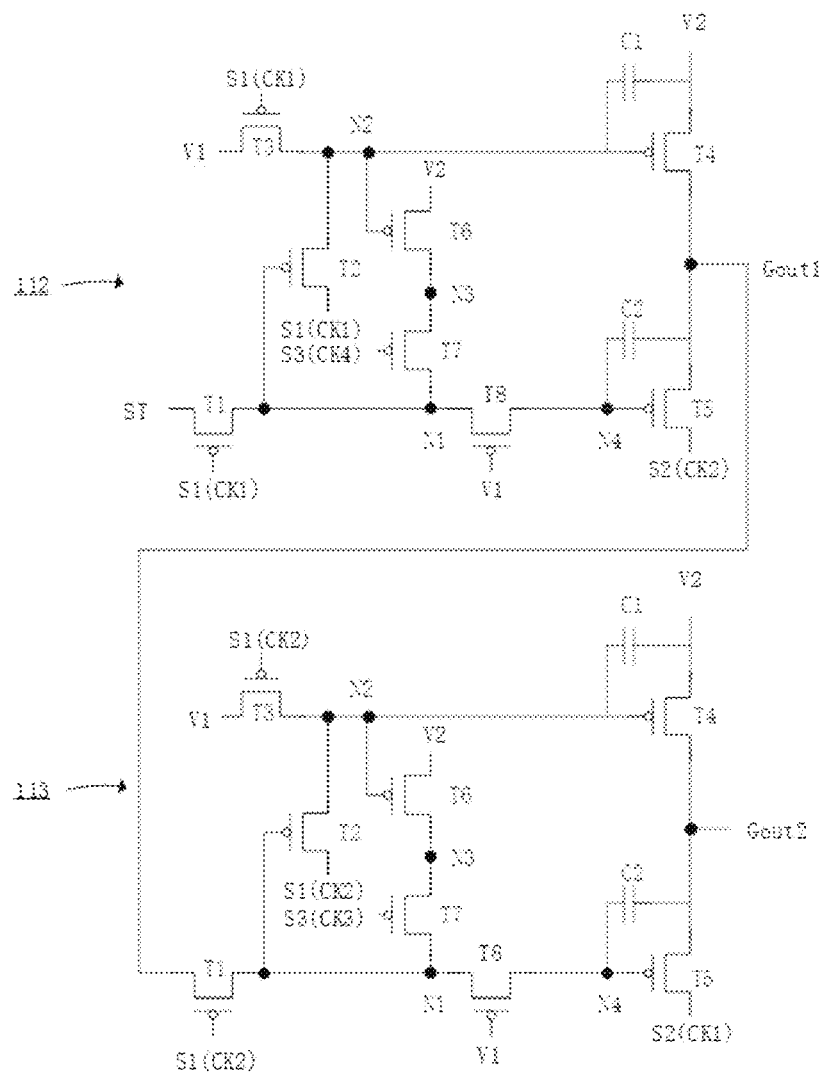
FIG. 11 is a schematic partial circuit diagram of a scan driver circuit.
Figure 12:
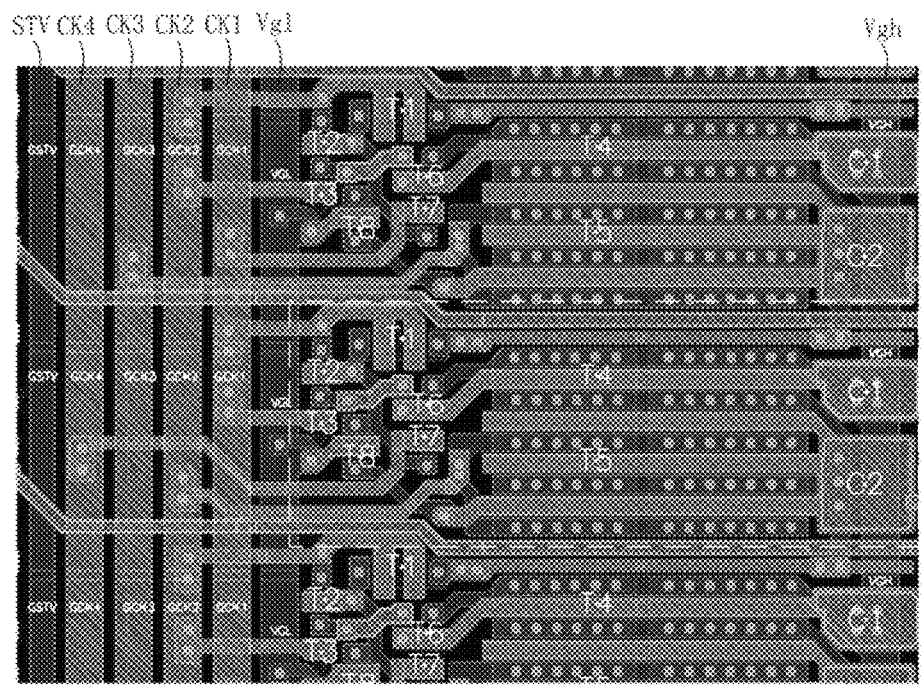
FIG. 12 is a partial layout of the scan driver circuit shown in FIG. 11.

FIG. 11 is a schematic partial circuit diagram of a scan driver circuit. FIG. 12 is a partial layout of the scan driver circuit shown in FIG. 11. The part within a white dotted box in FIG. 12 is the first shift register 112. As shown in FIG. 2, FIG. 11 and FIG. 12, in the first shift register 112, the first signal terminal S1 is connected to the first clock signal line CK1, the second signal terminal S2 is connected to the second clock signal line CK2, and the third signal terminal S3 is connected to the fourth clock signal line CK4. In the second shift register 113, the first signal terminal S1 is connected to the second clock signal line CK2, the second signal terminal S2 is connected to the first clock signal line CK1, and the third signal terminal S3 is connected to the third clock signal line CK3.

Figure 13:
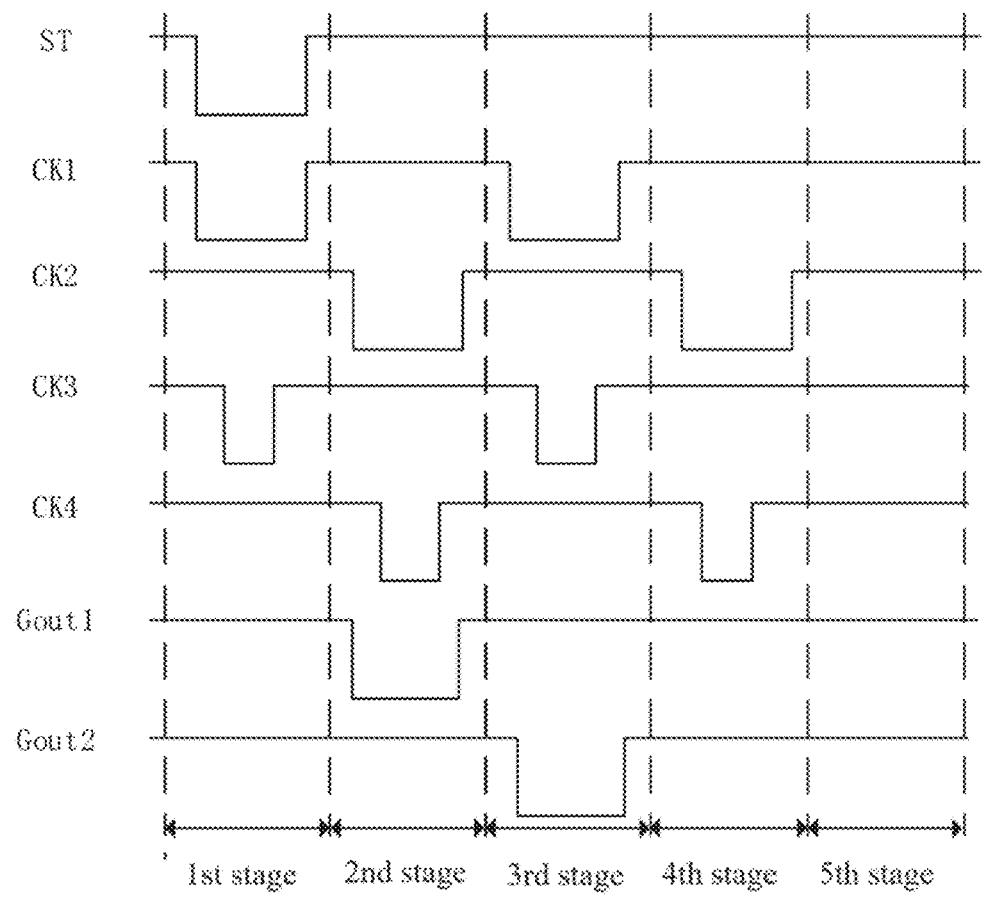
FIG. 13 is a schematic timing diagram of a scan driver circuit.

FIG. 13 is a schematic timing diagram of the scan driver circuit shown in FIG. 2, FIG. 11 and FIG. 12. As shown in FIG. 13, when the first clock signal line CK1 is at the active level, the second clock signal line CK2 is at the inactive level; when the second clock signal line CK2 is at the active level, the first clock signal line CK1 is at the inactive level; when the third clock signal line CK3 is at the active level, the fourth clock signal line CK4 is at the inactive level; when the fourth clock signal line CK4 is at the active level, the third clock signal line CK3 is at the inactive level; when the third clock signal line CK3 is at the active level, the first clock signal line CK1 is at the active level; when the fourth clock signal line CK4 is at the active level, the second clock signal line CK2 is at the active level.

EXAMPLE I

Further referring to FIG. 2, the plurality of shift registers in the scan driver circuit include a plurality of first shift registers 112 and a plurality of second shift registers 113 that are alternately arranged. The alternate arrangement of the first shift registers 112 and the second shift registers 113 means that they are arranged in an order of the first shift register 112, the second shift register 113, the first shift register 112, the second shift register 113, and cascaded. That is, the output terminal Gout of the first shift register 112 is connected to the starting signal terminal ST of the second shift register 113, and the output terminal Gout of the second shift register 113 is connected to the starting signal terminal ST of another first shift register 112, and so on.

The second clock signal line CK2 and the first clock signal line CK1 are not connected to the seventh transistor T7, so that the loads of the second clock signal line CK2 and the first clock signal line CK1 are reduced. When the signal in the first clock signal line CK1 or the second clock signal line CK2 switches between the high level and the low level, the time required for switching between the high level signal and the low level signal is shortened (the time required for the output terminal Gout to switch from the high level to the low level is shorter), that is, the falling edge time Tf of the output signal of the shift register is short. Accordingly, the difference between the rising edge time and falling edge time of signals at the data writing control terminal Gate and the reset control terminal Reset is reduced, and display defects are improved.

In addition, after a reliability test is performed on the shift register, the threshold voltage Vth of the transistor will shift, and the stage transfer characteristics of the shift register will deteriorate. In Example I, since the turn-on time of the seventh transistor T7 may be later than the turn-on time of the fifth transistor T5 through the third clock signal line CK3 and the fourth clock signal line CK4, the charges stored in the second capacitor C2 are prevented from being released through the seventh transistor T7, resulting in an increase of the potential of the fourth node N4, thus affecting the output of the shift register.

Figure 14:
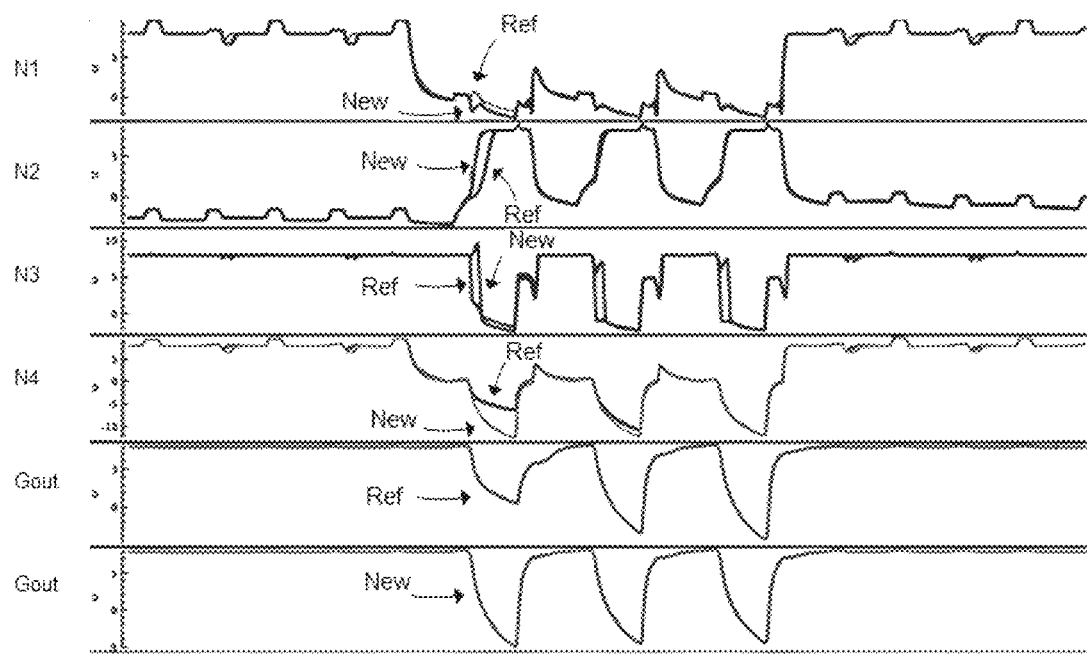
FIG. 14 is a diagram schematically illustrating potential waveforms of various nodes of the shift register after Vth is negatively biased.
Figure 15:
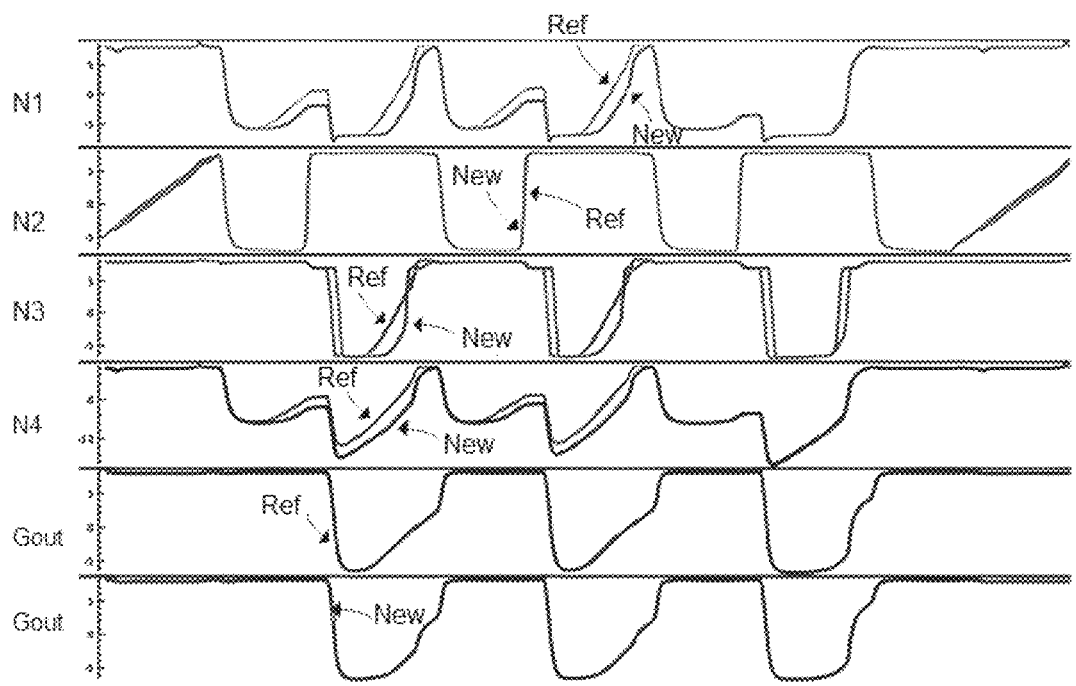
FIG. 15 is a diagram schematically illustrating potential waveforms of various nodes of the shift register after Vth is positively biased.

FIG. 14 is a diagram schematically illustrating potential waveforms of various nodes of the shift register after Vth is negatively biased, FIG. 15 is a diagram schematically illustrating potential waveforms of various nodes of the shift register after Vth is positively biased, where "Ref" represents the waveforms in the related art, and "New" represents the waveforms of Example I. As can be seen from FIG. 14 and FIG. 15, no matter whether Vth is negatively biased or positively biased, the waveform of each node of the shift register approaches an ideal waveform.

The scan driver circuit in the related art as shown in FIG. 4 requires at least four clock signal lines. However, as shown in FIG. 2, merely four clock signal lines, that is, the first clock signal line CK1, the second clock signal line CK2, the third clock signal line CK3, and the fourth clock signal line CK4, are provided in the scan driver circuit in Example I. Therefore, Example I can improve the output of the shift register without increasing the number of clock signal lines, thereby improving display defects.

As an example, the scan driver circuit includes 2340 cascaded shift registers. In the scan driver circuit in the related art, the capacitance of the clock signal line connected to the first clock signal terminal CK is 73.13 fF, the capacitance of the clock signal line connected to the second clock signal terminal CB is 73.13 fF, the total capacitance of the clock signal lines connected to the first clock signal terminal CK is 171.12 pF, and the total capacitance of the clock signal lines connected to the second clock signal terminal CB is 171.12 pF. In Example I, the capacitance of the first clock signal line CK1 is 39.64 fF, the capacitance of the second clock signal line CK2 is 39.64 fF, the capacitance of the third clock signal line CK3 is 59.01 fF, the capacitance of the fourth clock signal line CK4 is 59.01 fF, the total capacitance of the first clock signal line CK1 is 92.76 pF, the total capacitance of the second clock signal line CK2 is 92.76 pF, the total capacitance of the third clock signal line CK3 is 138.09 pF, and the total capacitance of the fourth clock signal line CK4 is 138.09 pF.

EXAMPLE II

Figure 16:
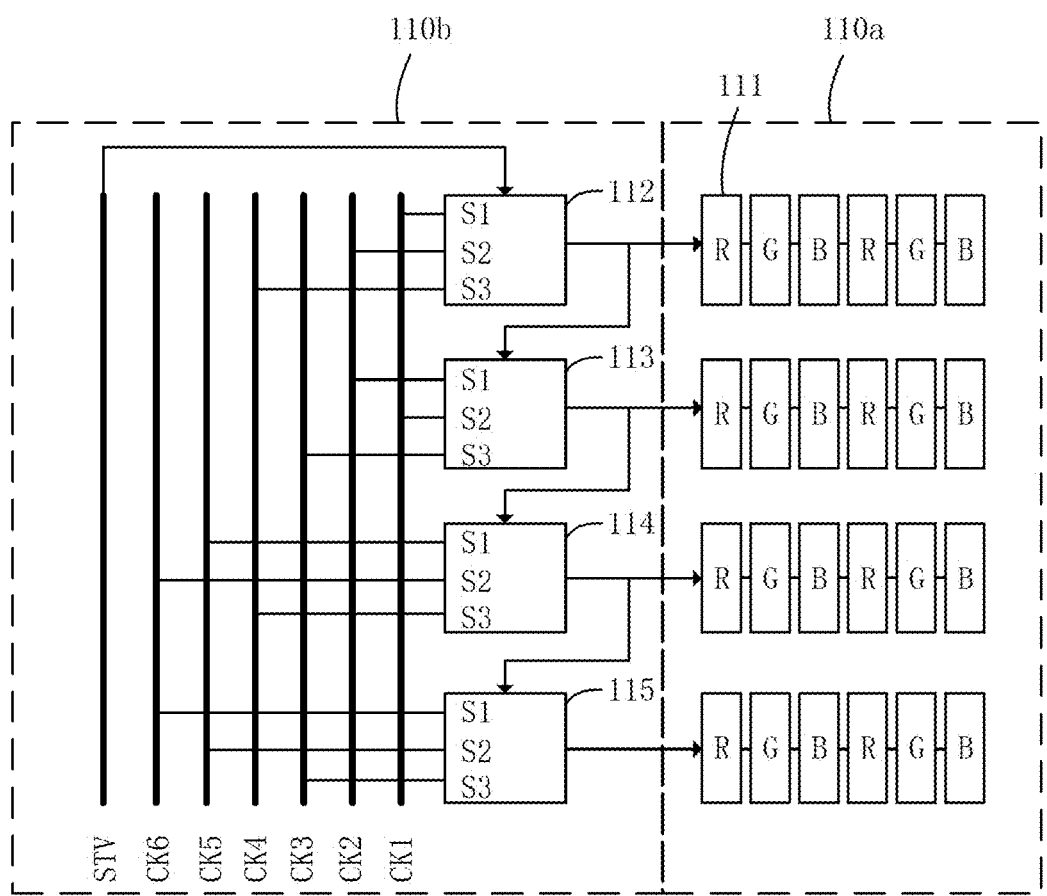
FIG. 16 is a schematic structural block diagram of another display panel.
Figure 17:
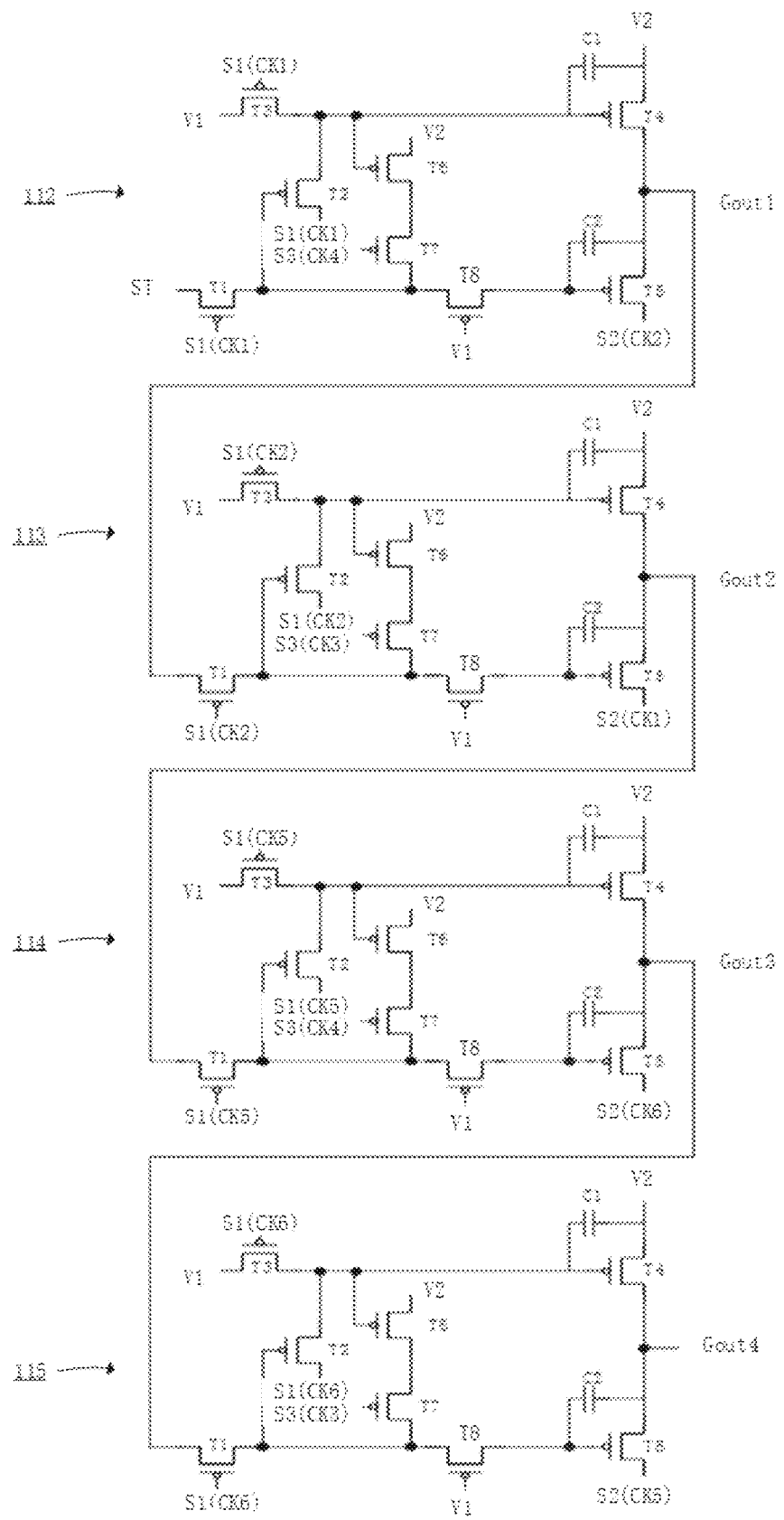
FIG. 17 is a schematic circuit diagram of a scan driver circuit.
Figure 18:
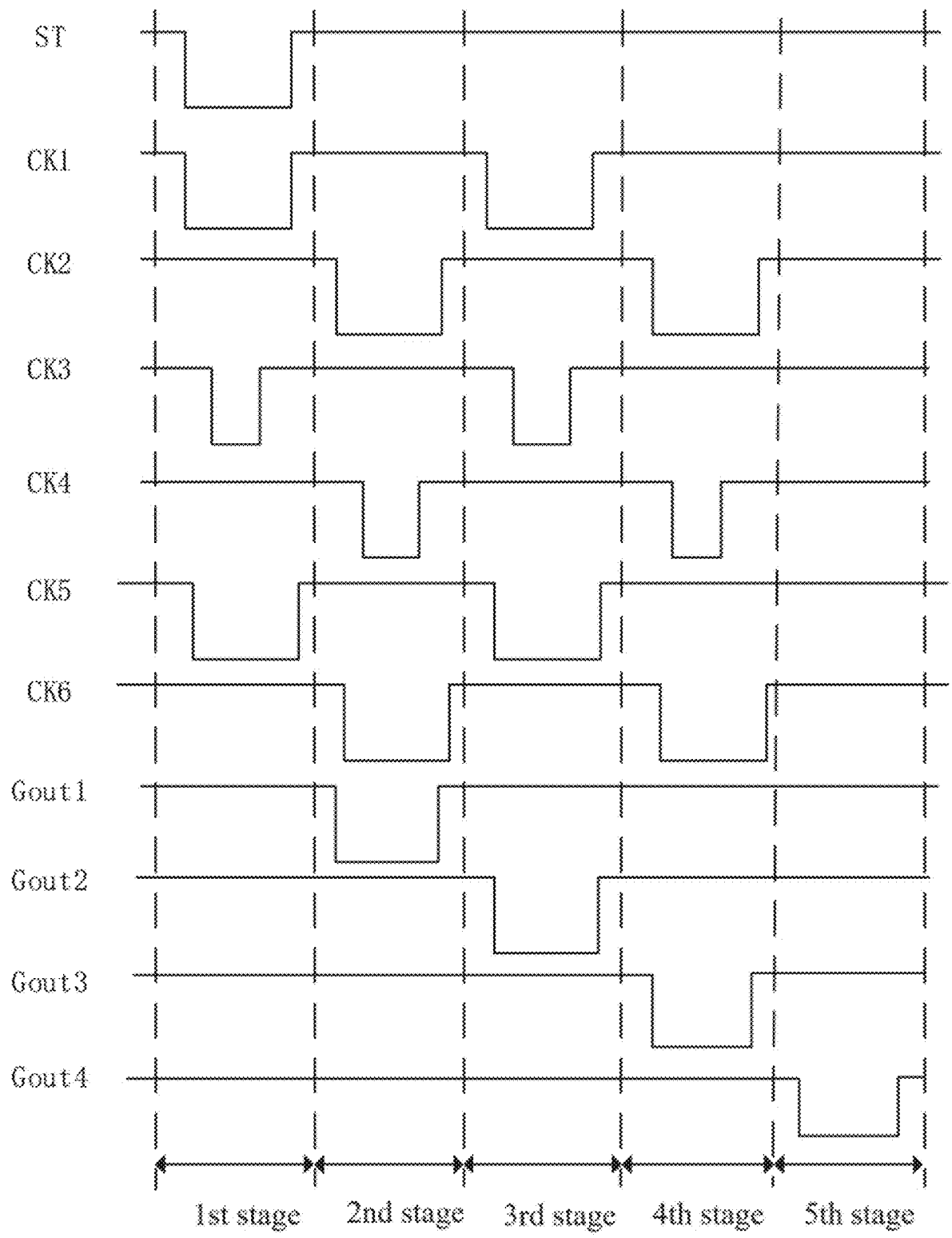
FIG. 18 is a schematic timing diagram of a scan driver circuit.

FIG. 16 is a schematic structural block diagram of another display panel. FIG. 17 is a schematic circuit diagram of a scan driver circuit. FIG. 18 is a schematic timing diagram of the scan driver circuit. As shown in FIG. 16 to FIG. 18, the clock signal lines also include a fifth clock signal line CK5 and a sixth clock signal line CK6, and the plurality of shift registers also include a third shift register 114 and a fourth shift register 115. The first shift register 112, the second shift register 113, the third shift register 114, and the fourth shift register 115 are arranged in sequence and connected in cascade. In the third shift register 114, the first signal terminal S1 is connected to the fifth clock signal line CK5, the second signal terminal S2 is connected to the sixth clock signal line CK6, and the third signal terminal S3 is connected to the fourth clock signal line CK4. In the fourth shift register 115, the first signal terminal S1 is connected to the sixth clock signal line CK6, the second signal terminal S2 is connected to the fifth clock signal line CK5, and the third signal terminal S3 is connected to the third clock signal line CK3.

In Example II, the fifth clock signal line CK5 and the sixth clock signal line CK6 are added. The fifth clock signal line CK5 is connected to the first signal terminal S1 of the third shift register 114 and the second signal terminal S2 of the fourth shift register 115, so hat the load of the first clock signal line CK1 is reduced compared with Example I. The sixth clock signal line CK6 is connected to the second signal terminal S2 of the third shift register 114 and the first signal terminal S1 of the fourth shift register 115, so that the load of the second clock signal line CK2 is reduced compared with Example I.

The shift registers may be divided into multiple cascaded shift register units, and each of the shift register units includes two cascaded shift registers. In the same shift register unit, the first signal terminal S1 of one shift register and the second signal terminal S2 of the other shift register are connected to the same signal line.

EXAMPLE III

Figure 19:
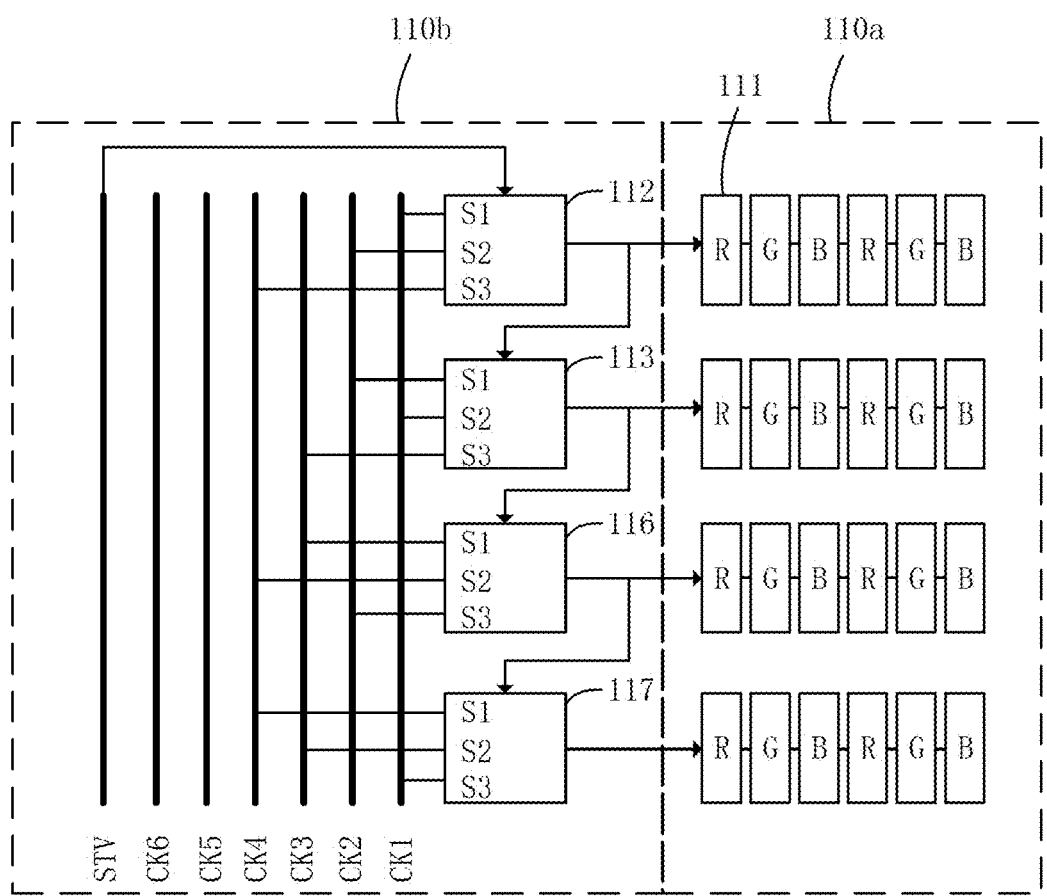
FIG. 19 is a schematic structural block diagram of another display panel.
Figure 20:
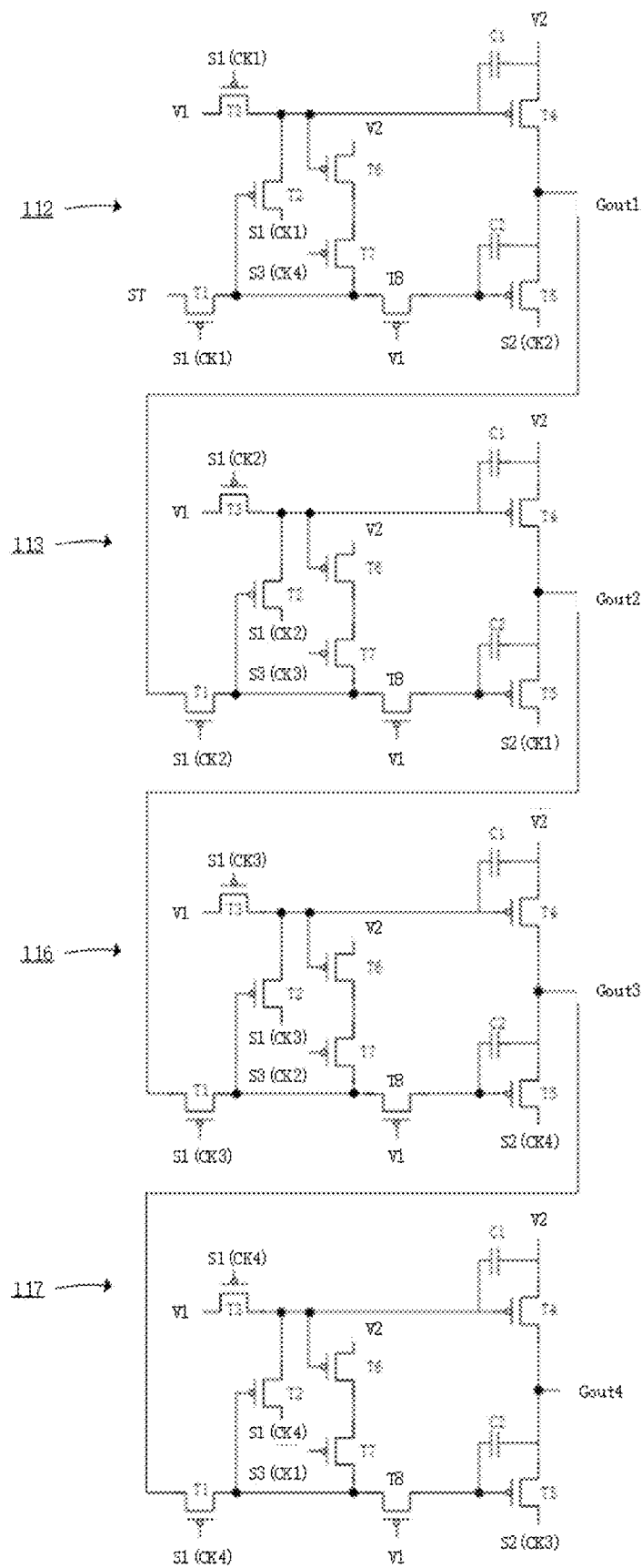
FIG. 20 is a schematic partial circuit diagram of a scan driver circuit.
Figure 21:
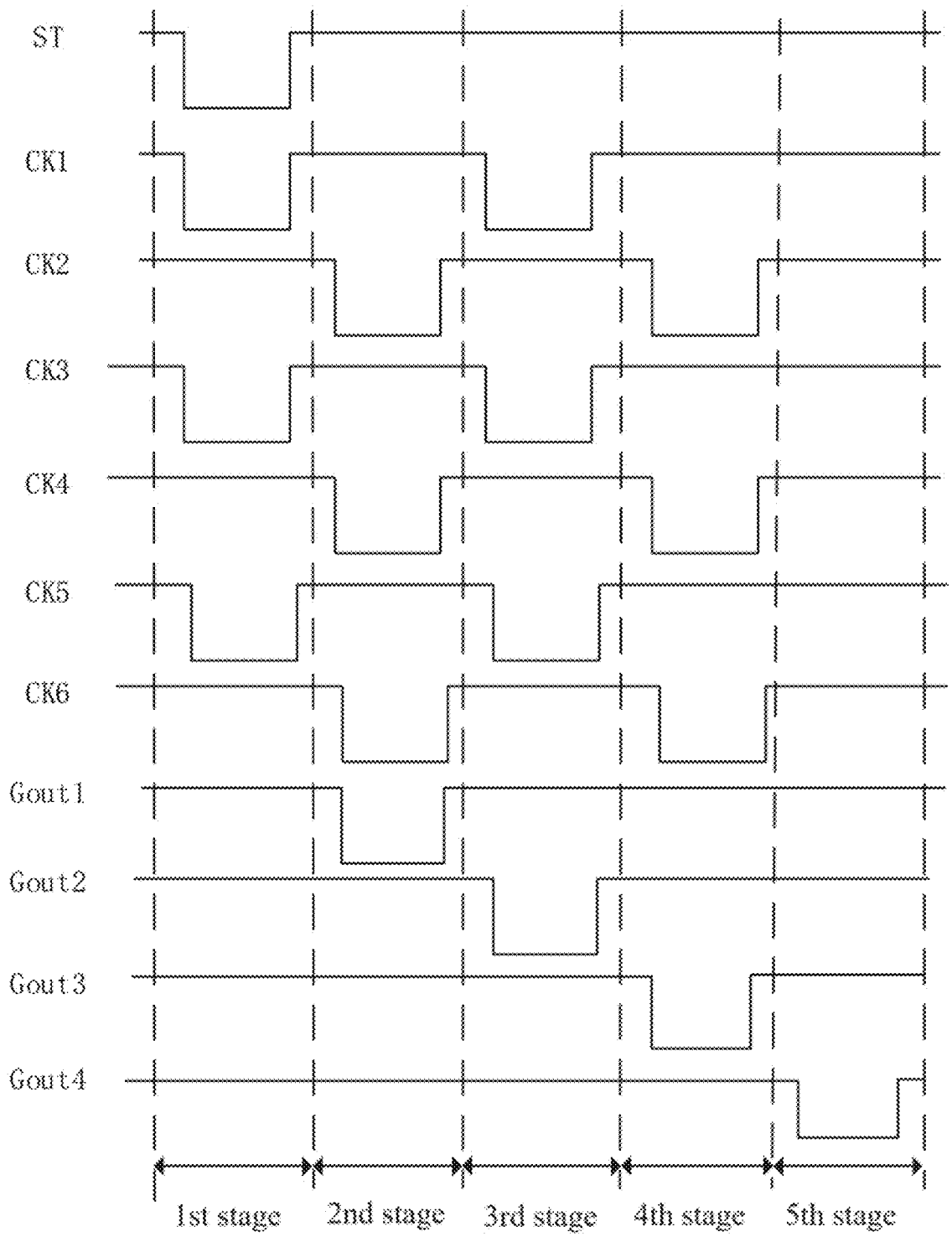
FIG. 21 is a schematic timing diagram of a scan driver circuit.

FIG. 19 is a schematic structural block diagram of another display panel. FIG. 20 is a schematic partial circuit diagram of a scan driver circuit. FIG. 21 is a schematic timing diagram of the scan driver circuit. As shown in FIG. 19 to FIG. 21, the plurality of shift registers also include a fifth shift register 116 and a sixth shift register 117, the first shift register 112, the second shift register 113, the fifth shift register 116, and the sixth shift register 117 are arranged in sequence and connected in cascade. In the fifth shift register 116, the first signal terminal S1 is connected to the third clock signal line CK3, the second signal terminal S2 is connected to the fourth clock signal line CK4, and the third signal terminal S3 is connected to the second clock signal line CK2. In the sixth shift register 117, the first signal terminal S1 is connected to the fourth clock signal line CK4, the second signal terminal S2 is connected to the third clock signal line CK3, and the third signal terminal S3 is connected to the first clock signal line CK1.

Compared with Example II, only four clock signal lines are provided in the scan driver circuit, that is, the number of clock signal lines is reduced, so that the bezel of the display panel 110 is narrower.

Some embodiments of the present disclosure provide a control method of a scan driver circuit, that is used for controlling the above-mentioned scan driver circuit. FIG. 22 is a block diagram schematically illustrating steps of the control method of the scan driver circuit. As shown in FIG. 22, the control method of the scan driver circuit includes steps described below.

At step S100, in the first stage, a first clock signal is provided to the first signal terminal, a second clock signal is provided to the second signal terminal, and a third clock signal is provided to the third signal terminal. Accordingly, the input sub-circuit is turned on under the control of the signal at the first signal terminal, and the signal at the starting signal terminal is written into the first node; the first control sub-circuit is turned on under the control of the signal at the first node, and the signal at the first signal terminal is written into the second node; the second control sub-circuit remains the off state under the control of signals at the second node and the third signal terminal; the output sub-circuit is turned on under the control of signals at the first node and the second node, and signals at the second signal terminal and the second voltage terminal are written into the output terminal.

The signal at the first signal terminal is the first clock signal, the signal at the second signal terminal is the second clock signal, and the signal at the third signal terminal is the third clock signal. The clock signal may be different at different stages. For example, at the first stage, the first clock signal is a low level signal, and the second clock signal and the third clock signal are high level signals; at the second stage, the first clock signal is a high level signal, and the second clock signal and the third clock signal are low level signals.

Exemplarily, at the first stage, the input sub-circuit writes the low level signal at the starting signal terminal ST into the first node N1 under the control of the low level signal at the first signal terminal S1, and the output sub-circuit writes the high level signal at the second signal terminal S2 into the output terminal Gout under the control of the low level signal at the first node N1, so that the shift register outputs the high level signal at the second signal terminal S2 through the output terminal Gout. The first control sub-circuit writes the low level signal at the first signal terminal S1 into the second node N2 under the control of the low level signal at the first node N1, and the output sub-circuit writes the high level signal at the second voltage terminal V2 into the output terminal Gout under the control of the low level signal at the second node N2, so that the shift register outputs the high level signal at the second voltage terminal V2 through the output terminal Gout. Moreover, the second control sub-circuit is non-conductive under the control of signals at the second node N2 and the third signal terminal S3, so that the first node N1 is disconnected from the second node N2.

At step S200, at the second stage, the first clock signal is provided to the first signal terminal, the second clock signal is provided to the second signal terminal, and the third clock signal is provided to the third signal terminal. Accordingly, the input sub-circuit remains the off state under the control of the first clock signal; the first control sub-circuit is turned on under the control of the signal at the first node, and the signal at the first signal terminal is written into the second node; the second control sub-circuit remains the off state under the control of the signals at the third signal terminal and the second node; the output sub-circuit is turned on under the control of signals at the second node and the first node, and the signal at the second signal terminal is written into the output terminal.

Exemplarily, at the second stage, the output sub-circuit writes the low level signal at the second signal terminal S2 into the output terminal Gout under the control of the low level signal at the first node N1, so that the shift register outputs the low level signal at the second signal terminal S2 through the output terminal Gout. The first control sub-circuit writes the high level signal at the first signal terminal S1 into the second node N2 under the control of the low level signal at the first node N1. Moreover, the second control sub-circuit is non-conductive under the control of signals at the second node N2 and the third signal terminal S3, so that the first node N1 is disconnected from the second node N2.

In the control method of the scan driver circuit provided by the embodiment of the present disclosure, the first signal terminal S1, the second signal terminal S2 and the third signal terminal S3 of the same shift register are respectively provided with signals through different clock signal lines. That is, in the same shift register, the clock signal line connected to the second signal terminal S2 is connected to the output sub-circuit, and is not connected to the second control sub-circuit, which reduces the load of the clock signal line connected to the second signal terminal S2. After the load of the clock signal line connected to the second signal terminal S2 is reduced, the time required for the signal at the second signal terminal S2 to switch to a high level is shorter (the time required for the output terminal Gout to switch from a high level to a low level is shorter), that is, the falling edge time Tf of the output signal of the shift register is short. Accordingly, the difference between the rising edge time and falling edge time of signals at the data writing control terminal Gate and the reset control terminal Reset is reduced, and display defects are improved.

In some embodiments, the second control sub-circuit includes a seventh transistor T7. The control electrode of the seventh transistor T7 is connected to the third signal terminal S3, the first electrode of the seventh transistor T7 is connected to the third node N3, and the second electrode of the seventh transistor T7 is connected to the first node N1. The seventh transistor T7 is configured to write the signal at the third node N3 into the first node N1 in response to the signal at the third signal terminal S3. The output sub-circuit includes a fifth transistor T5, an eighth transistor T8, and a second capacitor C2. The control electrode of the fifth transistor T5 is connected to the fourth node N4, the first electrode of the fifth transistor T5 is connected to the second signal terminal S2, and the second electrode of the fifth transistor T5 is connected to the output terminal Gout. The fifth transistor T5 is configured to write the signal at the second signal terminal S2 into the output terminal Gout in response to the signal at the fourth node N4. The control electrode of the eighth transistor T8 is connected to the first voltage terminal V1, the first electrode of the eighth transistor T8 is connected to the first node N1, and the second electrode of the eighth transistor T8 is connected to the fourth node N4. The eighth transistor T8 is configured to, in response to the signal at the first voltage terminal V1, write the signal at the first node N1 into the fourth node N4 or write the signal at the fourth node N4 into the first node N1. One plate of the second capacitor C2 is connected to the output terminal Gout, and the other plate is connected to the fourth node N4. The second capacitor C2 is configured to store the signal at the fourth node N4 so that the signal at the fourth node N4 does not undergo a sudden change.

In the same frame period, the active level period of the second signal overlaps with the active level period of the third signal, and the leading edge of the active level in the second signal is ahead of the leading edge of the active level in the third signal.

Exemplarily, the time when an active level signal is provided to the second signal terminal S2 is the first time t1, the time when an active level signal is provided to the third signal terminal S3 is the second time t2, and the first time t1 is earlier than the second time t2.

At the second stage, during a period from the first time t1 to the second time t2, the signal at the second signal terminal S2 switches to a low level signal, and the fourth node N4 and the first node N1 remain at low level under the action of the second capacitor C2, causing the fifth transistor T5 and the second transistor T2 to be turned on. At this time, the signal at the third signal terminal S3 is still a high level signal, the seventh transistor T7 is not turned on. Therefore, the charges stored in the second capacitor C2 will not be released to the third node N3 through the seventh transistor T7, nor will the parasitic capacitance formed between the gate and the active layer of the seventh transistor T7 be charged, so that the first node N1 and the fourth node N4 maintain a low level signal, thereby making the on-state of the fifth transistor T5 and the second transistor T2 relatively good. The charges stored in the second capacitor C2 are prevented from being released through the seventh transistor T7, so that the potential at the fourth node N4 increases, thereby affecting the output of the shift register.

The duty cycle of the second signal may be less than or equal to the duty cycle of the third signal. For example, in the same frame period, the lagging edge of the active level in the second signal is synchronized with the lagging edge of the active level in the third signal.

The device embodiments described above are only illustrative. Units described as separate components may or may not be physically separated. The components shown as units may or may not be physical units, that is, they may be located in one location, or may be distributed across multiple network units. Some or all of the modules may be selected according to actual needs to achieve the object of the solution of the embodiments. Those skilled in the art may understand and implement the method without paying any creative effort.

In the description provided herein, numerous specific details are set forth. However, it is understood that embodiments of the present disclosure may be practiced without these specific details. In some instances, common methods, structures and techniques have not been shown in detail in order not to obscure the understanding of this description.

Finally, it should be noted that the above embodiments are only used to explain the technical solutions of the present disclosure, rather than limiting them. Although the present disclosure has been described in detail with reference to the foregoing embodiments, those skilled in the art should understand that the technical solutions described in the foregoing embodiments can still be modified, or equivalent replacements for some of the technical features may be made; and these modification or replacement does not make the essence of the corresponding technical solutions deviate from the spirit and scope of the technical solutions of the embodiments of the present disclosure.

The invention claimed is:

1. A scan driver circuit, comprising multiple clock signal lines and multiple cascaded shift registers, wherein:
each of the shift registers comprises an input sub-circuit, a first control sub-circuit, a second control sub-circuit and an output sub-circuit;
the input sub-circuit is connected to a starting signal terminal, a first node and a first signal terminal, and the input sub-circuit is configured to write a signal at the starting signal terminal into the first node under the control of the signal at the first signal terminal;
the first control sub-circuit is connected to the first signal terminal, the first node and a second node, and the first control sub-circuit is configured to write the signal at the first signal terminal into the second node under the control of the signal at the first node;
the second control sub-circuit is connected to the first node, the second node, a second voltage terminal and a third signal terminal, and the second control sub-circuit is configured to write the signal at the second voltage terminal into the first node under the control of signals at the second node and the third signal terminal;
the output sub-circuit is connected to the first node, the second node, an output terminal, a second signal terminal and the second voltage terminal, and the output sub-circuit is configured to write the signal at the second signal terminal into the output terminal under the control of the signal at the first node, and is also configured to write the signal at the second voltage terminal into the output terminal under the control of the signal at the first node;
the second signal terminal and the third signal terminal of the same shift register are connected to different clock signal lines;
the clock signal lines comprise a first clock signal line, a second clock signal line, a third clock signal line and a fourth clock signal line, and the shift registers comprise a first shift register and a second shift register connected in cascade; in the first shift register, the first signal terminal is connected to the first clock signal line, the second signal terminal is connected to the second clock signal line, and the third signal terminal is connected to the fourth clock signal line; in the second shift register, the first signal terminal is connected to the second clock signal line, the second signal terminal is connected to the first clock signal line, and the third signal terminal is connected to the third clock signal line;
the shift registers further comprise a fifth shift register and a sixth shift register, and the first shift register, the second shift register, the fifth shift register, and the sixth shift register are cascaded in sequence; in the fifth shift register, the first signal terminal is connected to the third clock signal line, the second signal terminal is connected to the fourth clock signal line, and the third signal terminal is connected to the second clock signal line; in the sixth shift register, the first signal terminal is connected to the fourth clock signal line, the second signal terminal is connected to the third clock signal line, and the third signal terminal is connected to the first clock signal line; and
the clock signal lines further comprise a fifth clock signal line and a sixth clock signal line, and the shift registers further comprise a third shift register and a fourth shift register, the first shift register, the second shift register, the third shift register, and the fourth shift register are arranged in sequence and connected in cascade; in the third shift register, the first signal terminal is connected to the fifth clock signal line, the second signal terminal is connected to the sixth clock signal line, and the third signal terminal is connected to the fourth clock signal line; in the fourth shift register, the first signal terminal is connected to the sixth clock signal line, the second signal terminal is connected to the fifth clock signal line, and the third signal terminal is connected to the third clock signal line.

2. The scan driver circuit according to claim 1, wherein the clock signal lines are divided into multiple clock signal line groups, and each of the clock signal line groups comprises multiple clock signal lines;

the multiple clock signal line groups comprise a first clock signal line group and a second clock signal line group, wherein the third signal terminals in two cascaded shift registers are connected to different clock signal lines in the first clock signal line group, and the second signal terminals in the two cascaded shift registers are connected to different clock signal lines in the second clock signal line group.

3. The scan driver circuit according to claim 2, wherein the first signal terminals in two cascaded shift registers are connected to different clock signal lines in the second clock signal line group, and the first signal terminal and the second signal terminal in the same shift register are connected to different clock signal lines in the second clock signal line group.

4. The scan driver circuit according to claim 1, wherein the shift registers comprise multiple first shift registers and multiple second shift registers, and the first shift registers and the second shift registers are alternatively arranged.

5. The scan driver circuit according to claim 1, wherein the second control sub-circuit comprises a sixth transistor and a seventh transistor;

the sixth transistor comprises a gate connected to the second node, a first electrode connected to the second voltage terminal, and a second electrode connected to the third node;

the seventh transistor comprises a gate connected to the third signal terminal, a first electrode connected to the third node, and a second electrode connected to the first node.

6. The scan driver circuit according to claim 1, wherein the output sub-circuit comprises a fourth transistor, a fifth transistor, a first capacitor and a second capacitor;

the fourth transistor comprises a gate connected to the second node, a first electrode connected to the second voltage terminal, and a second electrode connected to the output terminal;

the fifth transistor comprises a gate connected to the first node, a first electrode connected to the second signal terminal, and a second electrode connected to the output terminal;

the first capacitor comprises one plate connected to the second voltage terminal, and the other plate connected to the second node;

the second capacitor comprises one plate connected to the output terminal, and the other plate connected to the first node.

7. The scan driver circuit according to claim 1, wherein the input sub-circuit comprises a first transistor;

wherein the first transistor comprises a gate connected to the first signal terminal, a first electrode connected to the starting signal terminal, and a second electrode connected to the first node.

8. The scan driver circuit according to claim 1, wherein the first control sub-circuit comprises a second transistor;

wherein the second transistor comprises a gate connected to the first node, a first electrode connected to the first signal terminal, and a second electrode connected to the second node.

9. The scan driver circuit according to claim 1, wherein the first control sub-circuit is also connected to a first voltage terminal, and the first control sub-circuit is further configured to write the signal at the first voltage terminal into the second node under the control of the signal at the first signal terminal.

10. The scan driver circuit according to claim 9, wherein the first control sub-circuit comprises a third transistor;

wherein the third transistor comprises a gate connected to the first signal terminal, a first electrode connected to the first voltage terminal, and a second electrode connected to the second node.

11. A display panel, comprising a scan driver circuit and a plurality of pixel driving circuits, an output terminal of the scan driver circuit being connected to the pixel driving circuit, wherein:

the scan driver circuit comprises multiple clock signal lines and multiple cascaded shift registers, each of the shift registers comprises an input sub-circuit, a first control sub-circuit, a second control sub-circuit and an output sub-circuit;

the input sub-circuit is connected to a starting signal terminal, a first node and a first signal terminal, and the input sub-circuit is configured to write a signal at the starting signal terminal into the first node under the control of the signal at the first signal terminal;

the first control sub-circuit is connected to the first signal terminal, the first node and a second node, and the first control sub-circuit is configured to write the signal at the first signal terminal into the second node under the control of the signal at the first node;

the second control sub-circuit is connected to the first node, the second node, a second voltage terminal and a third signal terminal, and the second control sub-circuit is configured to write the signal at the second voltage terminal into the first node under the control of signals at the second node and the third signal terminal;

the output sub-circuit is connected to the first node, the second node, an output terminal, a second signal terminal and the second voltage terminal, and the output sub-circuit is configured to write the signal at the second signal terminal into the output terminal under the control of the signal at the first node, and is also configured to write the signal at the second voltage terminal into the output terminal under the control of the signal at the first node;

the second signal terminal and the third signal terminal of the same shift register are connected to different clock signal lines;

the clock signal lines comprise a first clock signal line, a second clock signal line, a third clock signal line and a fourth clock signal line, and the shift registers comprise a first shift register and a second shift register connected in cascade; in the first shift register, the first signal terminal is connected to the first clock signal line, the second signal terminal is connected to the second clock signal line, and the third signal terminal is connected to the fourth clock signal line; in the second shift register, the first signal terminal is connected to the second clock signal line, the second signal terminal is connected to the first clock signal line, and the third signal terminal is connected to the third clock signal line;

the shift registers further comprise a fifth shift register and a sixth shift register, and the first shift register, the second shift register, the fifth shift register, and the sixth shift register are cascaded in sequence; in the fifth shift register, the first signal terminal is connected to the third clock signal line, the second signal terminal is connected to the fourth clock signal line, and the third signal terminal is connected to the second clock signal line; in the sixth shift register, the first signal terminal is connected to the fourth clock signal line, the second signal terminal is connected to the third clock signal line, and the third signal terminal is connected to the first clock signal line; and the clock signal lines further comprise a fifth clock signal line and a sixth clock signal line, and the shift registers further comprise a third shift register and a fourth shift register, the first shift register, the second shift register, the third shift register, and the fourth shift register are arranged in sequence and connected in cascade; in the third shift register, the first signal terminal is connected to the fifth clock signal line, the second signal terminal is connected to the sixth clock signal line, and the third signal terminal is connected to the fourth clock signal line; in the fourth shift register, the first signal terminal is connected to the sixth clock signal line, the second signal terminal is connected to the fifth clock signal line, and the third signal terminal is connected to the third clock signal line.

12. A display device, comprising the display panel according to claim 11.

13. A method for controlling the scan driver circuit according to claim 1, wherein a same frame period comprises a first stage and a second stage, and the method comprises:

at the first stage, providing a first clock signal to the first signal terminal, providing a second clock signal to the second signal terminal, and providing a third clock signal to the third signal terminal, so that the input sub-circuit is turned on under the control of the signal at the first signal terminal, and the signal at the starting signal terminal is written into the first node;

the first control sub-circuit is turned on under the control of the signal at the first node, and the signal at the first signal terminal is written into the second node;

the second control sub-circuit remains an off state under the control of signals at the second node and the third signal terminal; and the output sub-circuit is turned on under the control of signals at the first node and the second node, and signals at the second signal terminal and the second voltage terminal are written into the output terminal;

at the second stage, providing the first clock signal to the first signal terminal, providing the second clock signal to the second signal terminal, and providing the third clock signal to the third signal terminal, so that the input sub-circuit remains the off state under the control of the first clock signal;

the first control sub-circuit is turned on under the control of the signal at the first node, and the signal at the first signal terminal is written into the second node;

the second control sub-circuit remains the off state under the control of the signals at the third signal terminal and the second node; and the output sub-circuit is turned on under the control of signals at the second node and the first node, and the signal at the second signal terminal is written into the output terminal.

14. The method for controlling the scan driver circuit according to claim 13, wherein in the same frame period, an active level period of the second signal overlaps with an active level period of the third signal, and a leading edge of the active level in the second signal is ahead of the leading edge of the active level in the third signal.

15. The method for controlling the scan driver circuit according to claim 14, wherein a duty cycle of the second signal is less than or equal to the duty cycle of the third signal.

* * * * *